(12) United States Patent
Hoerdum et al.

(10) Patent No.: US 8,308,178 B2
(45) Date of Patent: Nov. 13, 2012

(54) COLLAPSIBLE BICYCLE

(75) Inventors: Martin Hoerdum, Cologne (DE);
Christian Bitsch, Dudenhofen (DE)

(73) Assignee: Topeak, Inc., Taichung (TW)

( * ) Notice: Subject to any disclaimer, the term of this patent is extended or adjusted under 35 U.S.C. 154(b) by 327 days.

(21) Appl. No.: 12/598,067

(22) PCT Filed: Aug. 6, 2008

(86) PCT No.: PCT/EP2008/060333
§ 371 (c)(1),
(2), (4) Date: Oct. 29, 2009

(87) PCT Pub. No.: WO2009/019285
PCT Pub. Date: Feb. 12, 2009

(65) Prior Publication Data
US 2010/0148467 A1     Jun. 17, 2010

(30) Foreign Application Priority Data

Aug. 9, 2007   (DE) .......................... 10 2007 037 648

(51) Int. Cl.
*B62K 15/00* (2006.01)
(52) U.S. Cl. .......................... 280/278; 280/287; 180/208
(58) Field of Classification Search .................. 280/278, 280/287, 281.1; 180/208
See application file for complete search history.

(56) References Cited

U.S. PATENT DOCUMENTS

| | | | | |
|---|---|---|---|---|
| 1,626,775 A | * | 5/1927 | Appelian et al. .............. | 280/278 |
| 1,799,573 A | * | 4/1931 | Thompson .................... | 280/301 |
| 4,026,573 A | * | 5/1977 | Richardson ................... | 280/278 |
| 4,296,940 A | * | 10/1981 | Herbert ......................... | 280/278 |
| 4,460,192 A | * | 7/1984 | Takamiya et al. ............. | 280/287 |
| 4,842,292 A | * | 6/1989 | Wang ............................. | 280/287 |

(Continued)

OTHER PUBLICATIONS

PCT Publication No. WO 03/016124 A, Feb. 27, 2003, 27 pages.

(Continued)

*Primary Examiner* — Tashiana Adams
*Assistant Examiner* — Maurice Williams
(74) *Attorney, Agent, or Firm* — Alan Kamrath; Kamrath IP Lawfirm, PA

(57) ABSTRACT

A collapsible bicycle (1) has a frame (2) collapsible in its plane. The frame (2) includes a head tube (3) having a collapsible bicycle front side end (10) in which a front wheel fork (12), which receives a front wheel (13), is mounted. A seat stay (5) has an end (38) receiving a seat tube (39). A lever (6) is articulated at a first articulation point (50) at a collapsible bicycle rear side end (37) of the head tube (3) and at a second articulation point (49) at the end (38) of the seat stay (5) receiving the seat tube (39). The lever (6) is arranged to the collapsible bicycle front side in a riding position of the collapsible bicycle (1). A down tube (4) is articulated at a third articulation point (18) at the collapsible bicycle front side end (10) of the head tube (3) and at a fourth articulation point (24) at an end (38a) of the seat stay (5), opposite the end (38) of the seat tube (39). The first, second, third and fourth articulation points (50; 49; 18; 24) are arranged in such a way, that, for moving the collapsible bicycle (1) from the riding position into a sliding position or from the sliding position into the riding position, respectively, the end (38) of the seat stay (5) receiving the seat tube (39) is shiftable in a direction (117) towards the head tube (3) or in a direction (119) away from the head tube, respectively.

34 Claims, 19 Drawing Sheets

U.S. PATENT DOCUMENTS

| | | | |
|---|---|---|---|
| 4,895,386 A * | 1/1990 | Hellestam et al. | 280/287 |
| 5,052,706 A * | 10/1991 | Tsai et al. | 280/287 |
| 6,032,971 A * | 3/2000 | Herder | 280/278 |
| 6,301,749 B1 * | 10/2001 | Chen | 16/429 |
| 6,364,335 B1 | 4/2002 | Mombelli | 280/287 |
| 6,979,013 B2 * | 12/2005 | Chen | 280/287 |
| 6,986,522 B2 * | 1/2006 | Sinclair et al. | 280/287 |
| 7,156,409 B2 * | 1/2007 | Chuang | 280/287 |
| 7,341,268 B2 * | 3/2008 | Lin | 280/278 |
| 2001/0004150 A1 * | 6/2001 | Murayama | 280/287 |
| 2002/0148324 A1 | 10/2002 | Bandarra | 74/551.4 |
| 2004/0032110 A1 * | 2/2004 | Bigot | 280/287 |
| 2006/0131091 A1 * | 6/2006 | Lin | 180/208 |
| 2006/0196322 A1 | 9/2006 | Chuang | 81/177.85 |
| 2006/0244237 A1 | 11/2006 | Chuang | 280/278 |
| 2007/0018422 A1 * | 1/2007 | Pan | 280/287 |
| 2007/0063478 A1 * | 3/2007 | Kwok et al. | 280/287 |

OTHER PUBLICATIONS

German Patent Publication No. DE 4311998 A1, Oct. 20, 1994, 22 pages.

German Patent Publication No. DE 102005022130 A1, Nov. 16, 2006, 20 pages.

European Patent Publication No. EP 1419085 B1, Mar. 9, 2005, 13 pages.

German Patent Publication No. DE9409766U1, Aug. 4, 1994, 19 pages.

* cited by examiner

FIG 8

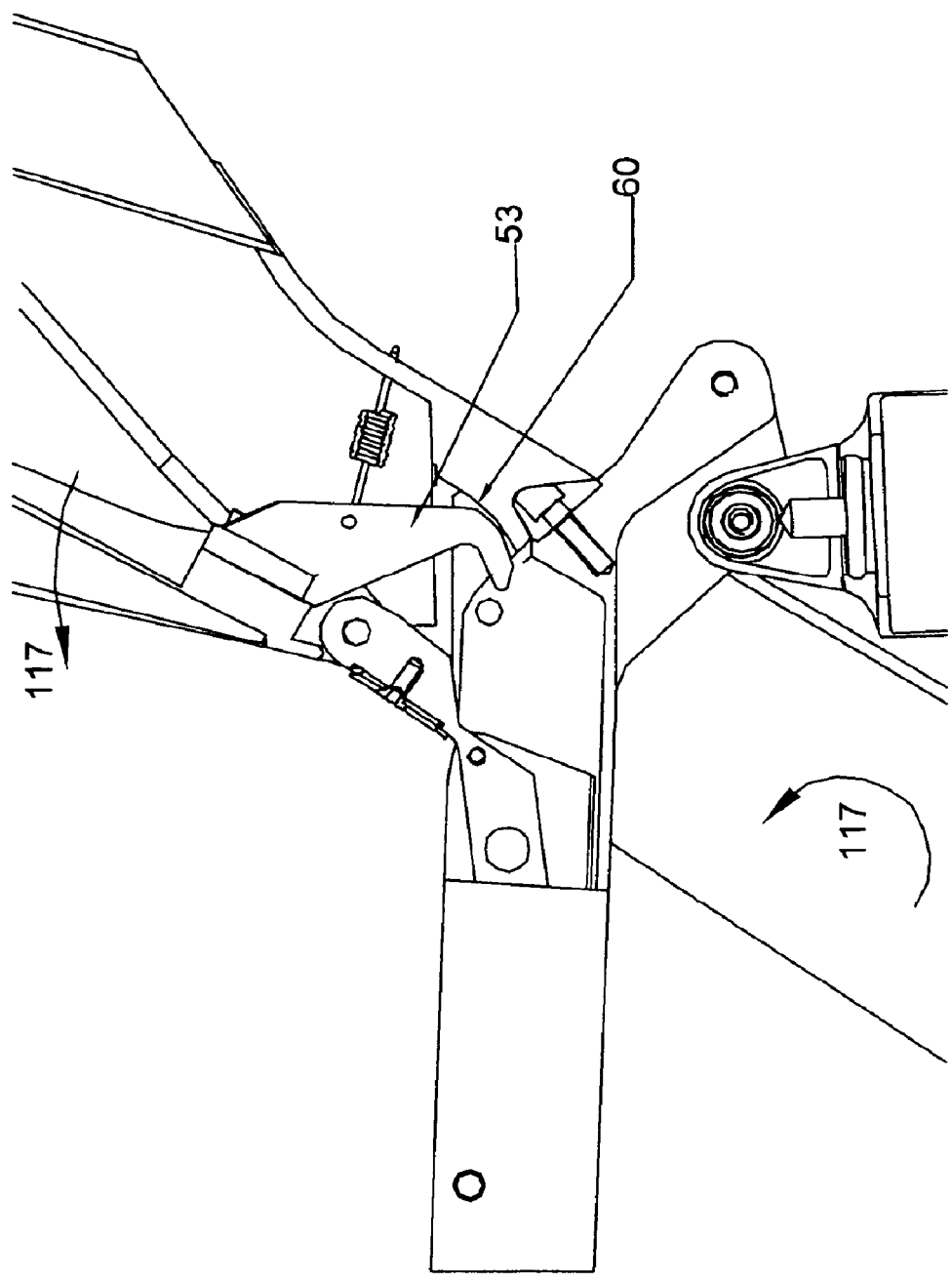

COLLAPSIBLE BICYCLE

BACKGROUND OF THE INVENTION

1. Field of the Invention

The present invention relates to a collapsible bicycle.

2. Description of the Related Art

Modern collapsible bicycles have to fulfill a variety of demands. These are in particular a beneficial volume of the collapsed collapsible bike, a high frame stiffness as well as a collapsible mechanism, which enables easy collapse of the collapsible bicycle.

Collapsible bicycles known from the prior art cope with these demands only in an insufficient manner.

Hence, the present invention provides an improved collapsible bicycle.

SUMMARY OF THE INVENTION

Accordingly a collapsible bicycle, having a frame, which is collapsible in its plane is provided. The frame comprises: a head tube having a collapsible bicycle front side end in which a front wheel fork, which receives a front wheel, is mounted. A seat stay, having an end, receives a seat tube. A lever is articulated at a first articulation point at a collapsible bicycle rear side end of the head tube and at a second articulation point at the end of the seat stay, and receives the seat tube. The lever in relation to the seat stay is arranged to the collapsible bicycle front side in a riding position of the collapsible bicycle. A down tube is articulated at a third articulation point at the collapsible bicycle front side end of the head tube, and at a fourth articulation point at an end of the seat stay, and is opposing the end of the seat tube. The first, second, third and fourth articulation points are arranged in such a way for moving the collapsible bicycle from the riding position into a sliding position or from the sliding position into the riding position, respectively. The end of the seat stay, which receives the seat tube, is shiftable in a direction towards the head tube or in a direction away from the head tube, respectively.

The idea of the present invention is based on the fact that a very convenient volume of the collapsible bicycle is reachable when the seat stay with the seat tube is shifted approximately in a direction towards the head tube.

The term "end" is at present also to be comprehended as an end section.

The term "stay" is at present to be comprehended as an elongated connecting element. Preferably at least one of the stays is provided as a tube.

The accessory or alternatively the stays may be bifurcated in appropriate areas.

The head tube comprises at present a possible front tube for supporting the front tube fork, which receives the front wheel.

According to a preferred embodiment, the collapsible bicycle further comprises a rear wheel fork, which receives a rear wheel. The rear wheel fork is articulated at a fifth articulation point at a collapsible bicycle rear side end of the down tube. A rear wheel stay is articulated at a sixth articulation point at the collapsible bicycle rear side end of the head tube, and at a seventh articulation point at the rear wheel fork. The first, second, third, fourth, fifth, sixth and seventh articulation points are arranged in such a way that the rear wheel shifts by shifting the end of the seat stay, which receives the seat tube, in a direction towards the head tube or in a direction away from it, respectively, in a direction towards the front wheel or in a direction away from the front wheel, respectively.

Advantageously, it is possible by the preceding described embodiment that just by shifting the upper end of the seat stay, which receives the seat tube, in a direction towards the head tube, the rear wheel is shifted in a direction towards the front wheel at the same time. The collapsible bicycle is then in a sliding position, the front and the rear wheels are in ground contact and are at the same time rotatable, and it is possible for the user to slide and to steer the collapsible bicycle by the handlebar. Hence, the collapsible bicycle, according to the present invention, is already provided in the sliding position with a very compact shape that enables the user to entrain the collapsible bicycle in crowded spaces like the underground railway or the departure platform. The user can slide the collapsible bicycle and does not need to carry it, like required with the collapsible bicycles known from the prior art when they are in a collapsible position.

In another preferred embodiment of the collapsible bicycle according to the present invention, the down tube comprises an end section bent towards the head tube and at which the seat stay is articulated. The bent end section is preferably bifurcated. This embodiment enables a shifting of the seat stay in a direction towards the head tube in such a way that the seat stay is essentially aligned over its whole length parallel and adjacent to the head tube.

In another preferred improvement of the collapsible bicycle according to the present invention, a lug, at which the rear wheel fork is articulated, protrudes from the bent end section. This advantageously determines that the rear wheel fork is able to be widely shifted in a direction towards the collapsible bicycle front side in such a way that the rear wheel is positioned as near as possible to the front wheel. The lug thereby enables, in sections, an almost parallel alignment of the rear wheel fork relative to the down tube.

According to another preferred embodiment of the collapsible bicycle according to the present invention, the seat stay comprises a fork-shaped section through which the head tube extends.

In the riding position of the collapsible bicycle, the seat stay extends essentially from down to head (in the present application "down" and "head" refer to the ground). Thereby, the seat stay intersects the head tube, which extends essentially from the collapsible bicycle front side to the collapsible bicycle rear side. For providing a high frame stiffness, the seat stay is therefore provided with a bifurcated section and encompasses the head tube. When shifting the head end of the seat stay, which receives the seat tube, in a direction towards the head tube, the seat stay is able to move unhindered relative to the head tube.

In another preferred improvement of the collapsible bicycle according to the present invention, the head tube comprises a recess in which the lever is concealed in the riding position of the collapsible bicycle. This is optically very advantageous.

In another preferred embodiment of the collapsible bicycle according to the present invention, the seat stay comprises a support element and the head tube comprises a receiving element which provides a form closure in one plane, which extends essentially perpendicular to the seat stay. Consequently, in the riding position, high transverse loads, resulting from riding on bumpy ground can be borne from a seat, which is attached to the seat stay.

Initially, the support element and the receiving element are mainly intended to avoid a shifting of the seat stay by the lever relatively to the head tube towards down, when the seat is loaded by the ascension of an user. Accessory, the stabilization according to the preceding embodiment is supposed to be provided in a transverse direction.

Preferably, the support element has a hollow conical shape, the receiving element has a conical shape, and they match together in the riding position of the collapsible bicycle. By this embodiment of the support element and the receiving element, a load bearing in a transverse direction and also the bearing of the gravitational force resulting from a user are enabled.

According to another preferred embodiment of the collapsible bicycle according to the present invention, the collapsible bicycle comprises a carrier and at least one carrier support stay. The carrier is articulated at an eighth articulation point, being at the seat stay, and the carrier support stay is articulated at a ninth articulation point, being at the end of the head tube, and at a tenth articulation point, being at the carrier. The eighth, ninth and tenth articulation points are arranged in such a way that the carrier is provided in the riding position and in the sliding position with an essentially horizontal position.

Hence, it is guaranteed that luggage, being clamped by the carrier, stays on the carrier and does not glide off, while the collapsible bicycle is moved from the riding position to the sliding position. This is especially beneficial for bags, which are fixedly mounted to the carrier.

According to another preferred improvement of the collapsible bicycle according to the present invention, the seat stay is compoundable to the head tube for the riding position of the collapsible bicycle by locking a connecting element arranged at the seat stay. The seat stay is releasable by shifting the seat stay in a first shifting direction relatively towards the head tube in a plane of the frame for the sliding position of the collapsible bicycle by loosening the connecting element. The connecting element ensures in the locked position that a shifting of the seat stay relatively to the head tube is avoided. Such a connecting element enables an easy way to turn the frame, which is stiff in the riding position, to be collapsible in itself for the sliding position.

According to another preferred improvement of the collapsible bicycle according to the present invention, the connecting element comprises a release handle articulated at the seat stay, and a hook adjacent to the release handle. The hook engages a pin arranged on the head tube for locking the connecting element, by shifting the hook in a second shifting direction, and releases the pin for loosening of the connecting element by shifting the hook in a first shifting direction. A connecting element of this kind enables, in a constructional easy way, to lock the head tube fixedly relatively to the seat stay. Thus, the head tube, the down tube and the seat stay provide a stiff triangle. Further, it is advantageous when a user uses the release handle for loosening the connecting element and shifting it in the first shifting direction, the hook releases its contact with the pin. When the user further operates the release handle in the first shifting direction, the seat stay shifts in the first shifting direction, and the end of the seat stay for receiving the seat tube shifts towards the head tube. Therefore, just one manipulation movement by the user is necessary—in the following designated as "one-step" manipulation—for moving the collapsible bicycle from the riding position into the sliding position. For example, the user does not have to change his grip.

In another preferred improvement of the collapsible bicycle according to the present invention, the release handle, the hook, and the pin interact as an upper dead centre mechanism. Thereby, an autonomous loosening of the connecting element is reliably avoided.

In another preferred improvement of the collapsible bicycle according to the present invention, a spring provides a pretension for the hook in the first shifting direction. This determines in an advantageous way, that, when the seat stay is shifted against the first shifting direction for moving the collapsible bicycle from the sliding position into the riding position that the hook is positioned to touch the pin just with its tip, and the tip slides over the pin and then encompasses it. Therefore, the seat stay is secured against unintentional shifting back towards the sliding position. Therewith, a handling of the collapsible bicycle is further simplified.

According to another preferred improvement of the collapsible bicycle according to the present invention, the seat stay is provided with a stop on which the released connecting element hits in the first shifting direction. A user, who manipulates the release handle for moving the collapsible bicycle from the riding position into the sliding position and after the connecting element is loosened, experiences an ergonomical benefit when it is not necessary to pull the release lever in essentially its longitudinal direction for shifting the seat stay relatively to the frame stay. This would happen without the stop, since a shifting movement of the connecting element would not be restricted, and, therefore, no torque could be applied to the seat stay for shifting it. Instead of that, the stop enables the application of a force on the release lever essentially transverse to its longitudinal direction for thus shifting the seat stay relatively to the head tube. The release lever can thus be used as a screw wrench, for example.

In another preferred improvement of the collapsible bicycle according to the present invention, the collapsible bicycle is provided with a handlebar comprising a fastening device attaching the handlebar to the front wheel fork, and two handlebar tubes. The two handlebar tubes are shiftably attached to the fastening device by hinges between the riding position and a first storing position of the collapsible bicycle or between the sliding position and a second storing position of the collapsible bicycle.

Thus, the collapsible bicycle is provided preferably with four positions: a riding position, a sliding position, a first storing position, and a second storing position.

In the riding position and in the sliding position, the handlebar tubes are in a collapsed position with regard to the frame.

In the first storing position of the collapsible bicycle, the handlebar tubes are collapsed to the uncollapsed frame of the collapsible bicycle. Therefore, an advantageous volume for the collapsible bicycle is reached.

In the second storing position, the handlebar tubes are collapsed to the collapsed frame of the collapsible bicycle. Therefore, an even more advantageous volume for the collapsible bicycle is reached.

Therefore, in the first and second storing positions, the handlebar tubes are in a position collapsed to the frame.

In another preferred embodiment of the collapsible bicycle according to the present invention, each of the hinges comprises a bearing half attached to the handlebar tube, a bearing half attached to the fastening device, and an articulated pin supporting the hinges. The bearing halves are connectable to each other for the driving position, sliding position, first and/or second storing positions in a frictional and/or positive locking. Thereby, the articulated pin preferably extends through boreholes in the two bearing halves in a way that they are shiftable relative to each other. By the preceding embodiment, it is possible, in a very easy way, to arrange the handlebar tubes in the uncollapsed or collapsed position, and secure them in these positions against a shifting relatively to the fastening device.

In another preferred improvement of the collapsible bicycle according to the present invention, a clamping lever comprises the articulated pin which allows pressing the bearing halves together. Hence, it is possible to do a very fast adjustment of the handlebar tubes from the uncollapsed to the collapsed position, or backwards, because clamping levers can be closed or loosened very fast. The clamping lever clamps the two bearing halves to each other in a positive and/or frictional locking.

According to another preferred embodiment of the collapsible bicycle according to the present invention, the bearing halves comprise corresponding receiving and engaging elements. The receiving and engaging elements engage each other in the uncollapsed or collapsed position and thus lead to a secure fixation of a shifting movement of the handlebar tubes relatively to the connecting element. Furthermore, it is possible to define certain handlebar tube positions for the uncollapsed and the collapsed positions of the handlebar tubes by the receiving and engaging elements.

In another preferred improvement of the collapsible bicycle according to the present invention, the bearing halves, which are provided at the handlebar tubes, are linked together by a cardan joint. The cardan joint provides a symmetrical adjustment of the handlebar tubes relative to the fastening device and the frame of the bicycle, respectively. Further, the cardan joint enables a user to actuate just one of the handlebar tubes for moving the collapsible bicycle from the riding position or the sliding position, respectively, into the storing position, for moving the other handlebar tube in the storing position, at the same time, or from the storing position to the driving position or sliding position, respectively.

According to another preferred embodiment of the collapsible bicycle according to the present invention, grips of the handlebar tubes extend in the riding position and sliding position essentially perpendicular to the plane of the frame, and in the first and the second storing positions extend essentially in the plane of the frame. Therefore, a very comfortable riding position for the user and a very advantageous volume of the collapsible bicycle in the storing position are provided.

According to another preferred embodiment of the collapsible bicycle according to the present invention, the collapsible bicycle comprises a stand holder, on which is shiftably fitted a stand between an extended position for supporting the collapsible bicycle and a retracted position for riding the collapsible bicycle, and a stand stay. The stand holder is articulated at an eleventh articulation point, being at the rear fork, and the stand stay is articulated at a twelfth articulation point, being at the lower end of the seat stay, and at a thirteenth articulation point, being at the stand holder. The eleventh, twelfth and thirteenth articulation points are arranged in such a way that the stand stays in the extracted position when passing the collapsible bicycle between the riding position and the sliding position. Therefore, it is possible to park the collapsible bicycle in the riding position as well as in the sliding position by the stand, thus increasing ease of use even more.

BRIEF DESCRIPTION OF THE DRAWINGS

The invention is explained in the following on the basis of exemplary embodiments with reference to the attached figures of the drawing.

In the figures:

FIG. 8 shows a perspective view B from FIG. 7, viewed obliquely from behind, with a section through the seat stay represented.

FIG. 9 shows the view from FIG. 7, with the closing element released.

In the figures, the same reference numbers denote the same or functionally similar components. For the sake of clarity, the carrier has not been represented in some of the figures.

DETAILED DESCRIPTION OF THE PREFERRED EMBODIMENTS

Figure 1:
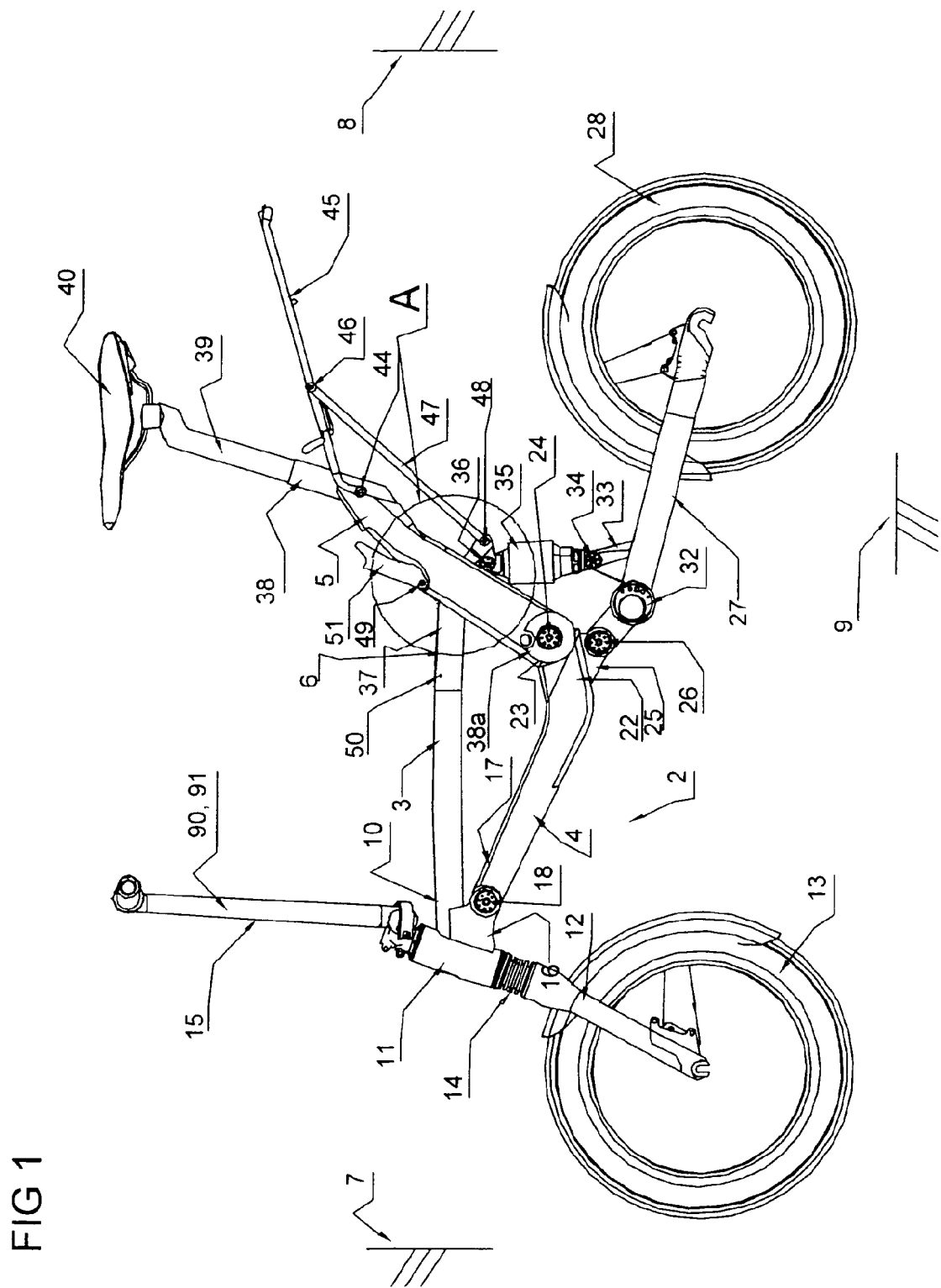
FIG. 1 shows, in a side view, a collapsible bicycle in a riding position according to an exemplary embodiment of the present invention.
Figure 2:
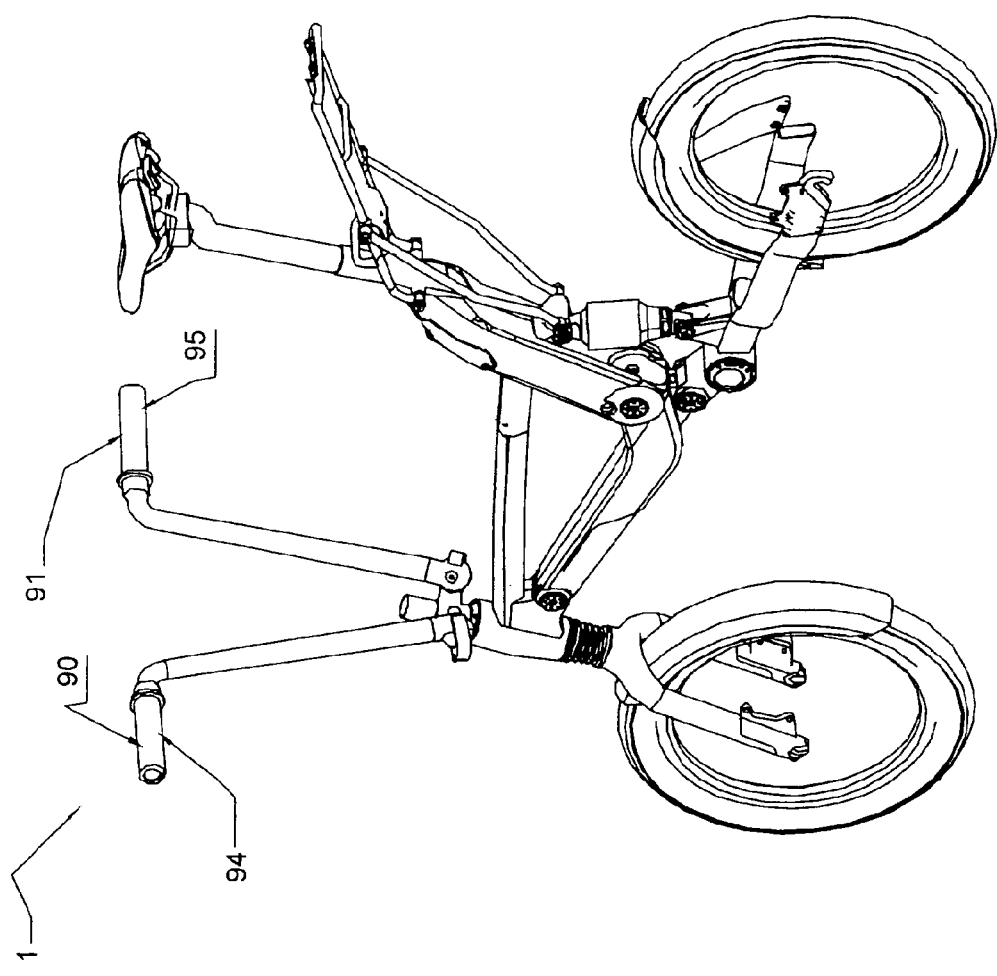
FIG. 2 shows the collapsible bicycle from FIG. 1 in a perspective view, viewed obliquely from the rear.
Figure 3:
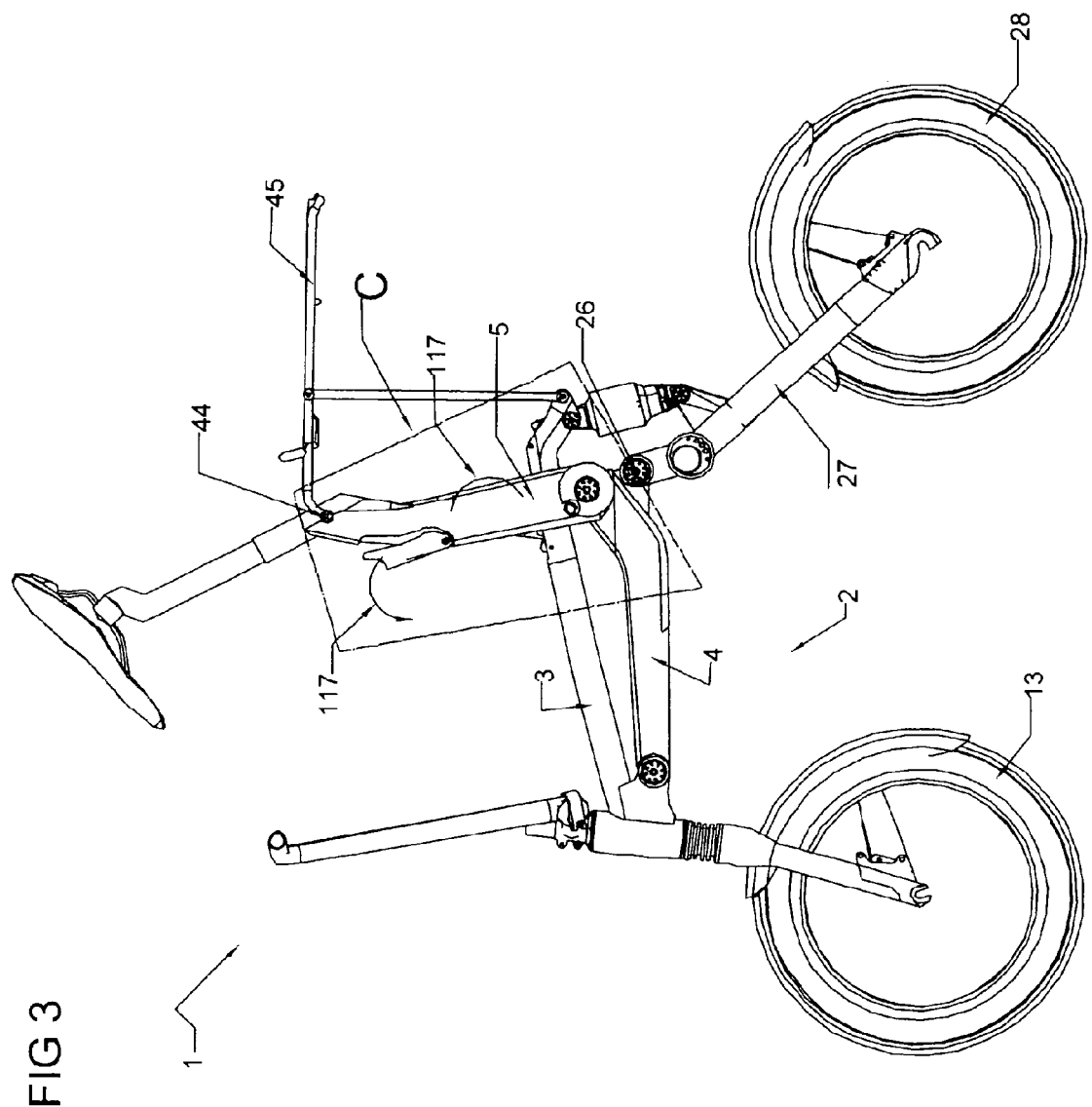
FIG. 3 shows the collapsible bicycle from FIG. 1 in a position between the riding position and a sliding position.

FIG. 1 shows a collapsible bicycle 1 according to an exemplary embodiment of the present invention.

The collapsible bicycle 1 comprises a frame 2 which is collapsible in its plane, i.e. in the paper plane in FIG. 1.

Figure 7:
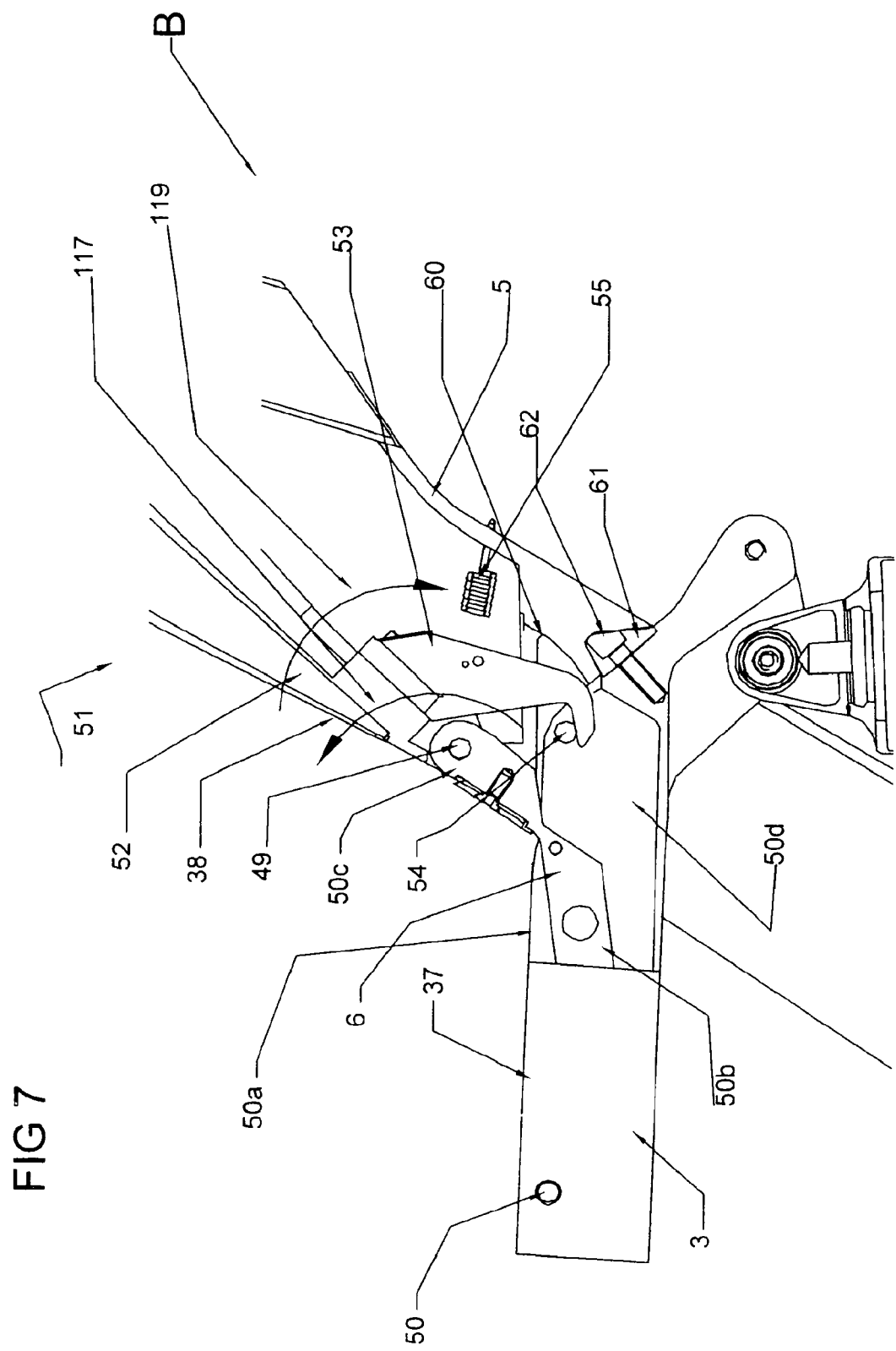
FIG. 7 shows an enlarged sectional view A from FIG. 1, with a section in the frame plane through a seat stay and a head tube of the frame, with the closing element locked.

The frame 2 consists of a head tube 3, a down tube 4, a seat stay 5 and a lever 6 (see FIG. 7).

The collapsible bicycle front side and the collapsible bicycle rear side have been denoted by reference numbers 7 and 8, respectively for a clearer explanation. The ground to which the terms "down" and "head" relate in the following is denoted by the reference number 9.

The head tube 3 comprises, at its collapsible bicycle front side end 10, a front tube 11 in which a front wheel fork 12, which receives a front wheel 13, is pivotably mounted for steering the collapsible bicycle.

Figure 13:
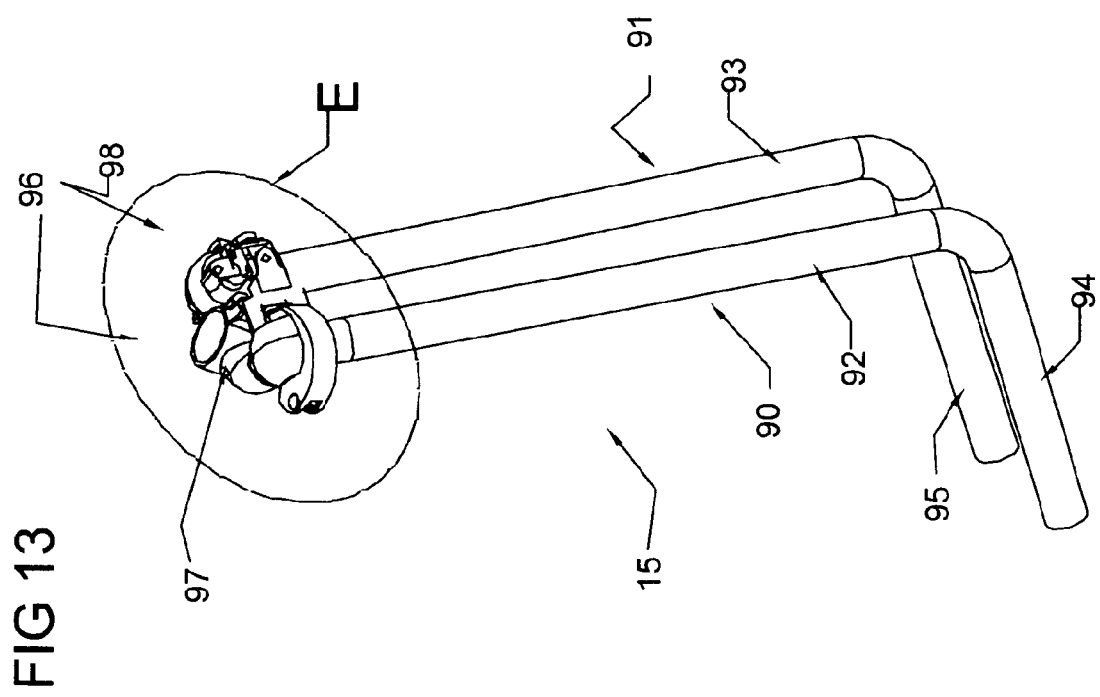
FIG. 13 shows, in a perspective view, the handlebar from FIG. 5, i.e. in the collapsed condition.

The front wheel fork 12 preferably comprises a damper element 14 able to absorb impacts in a longitudinal direction of the front wheel fork 12. A handlebar 15 is releasably fastened to the front wheel fork 12 above the front tube 11, which handlebar 15 is explained in greater detail in relation with FIGS. 13 to 15.

An angle 16 is welded to the front tube 11 and the head tube 3. A collapsible bicycle front side end 17 of the down tube 4 is articulated at the angle 16 at an articulation point 18.

Opposing the end 17, the down tube 4 comprises on the collapsible bicycle rear side, an end section 22 bent towards the head tube 3. The end section 22 supports, at its end 23, an articulation point 24 by which the seat stay 5 is articulated at the down tube 4. In the end section 22, the down tube 4 is preferably formed in the shape of a fork to enable receiving the head tube 3 in the sliding position which is explained in greater detail later. A lug 25, which supports an articulation point 26 for articulating a rear fork 27 at the down tube 4, is preferably formed on the end section 22.

The rear wheel fork 27 receives a rear wheel 28. The rear wheel fork 27 comprises a support 32 for a bottom bracket bearing (not shown) for driving the collapsible bicycle 1. Furthermore, on the rear wheel fork 27, a lug 33 is formed which supports an articulation point 34 for articulating a rear wheel stay 35, which is designed as a damper element, at its one end. On its other end, the rear wheel stay 35 is articulated by an articulation point 36 at a collapsible bicycle rear side end 37 of the head tube 3.

Figure 6:
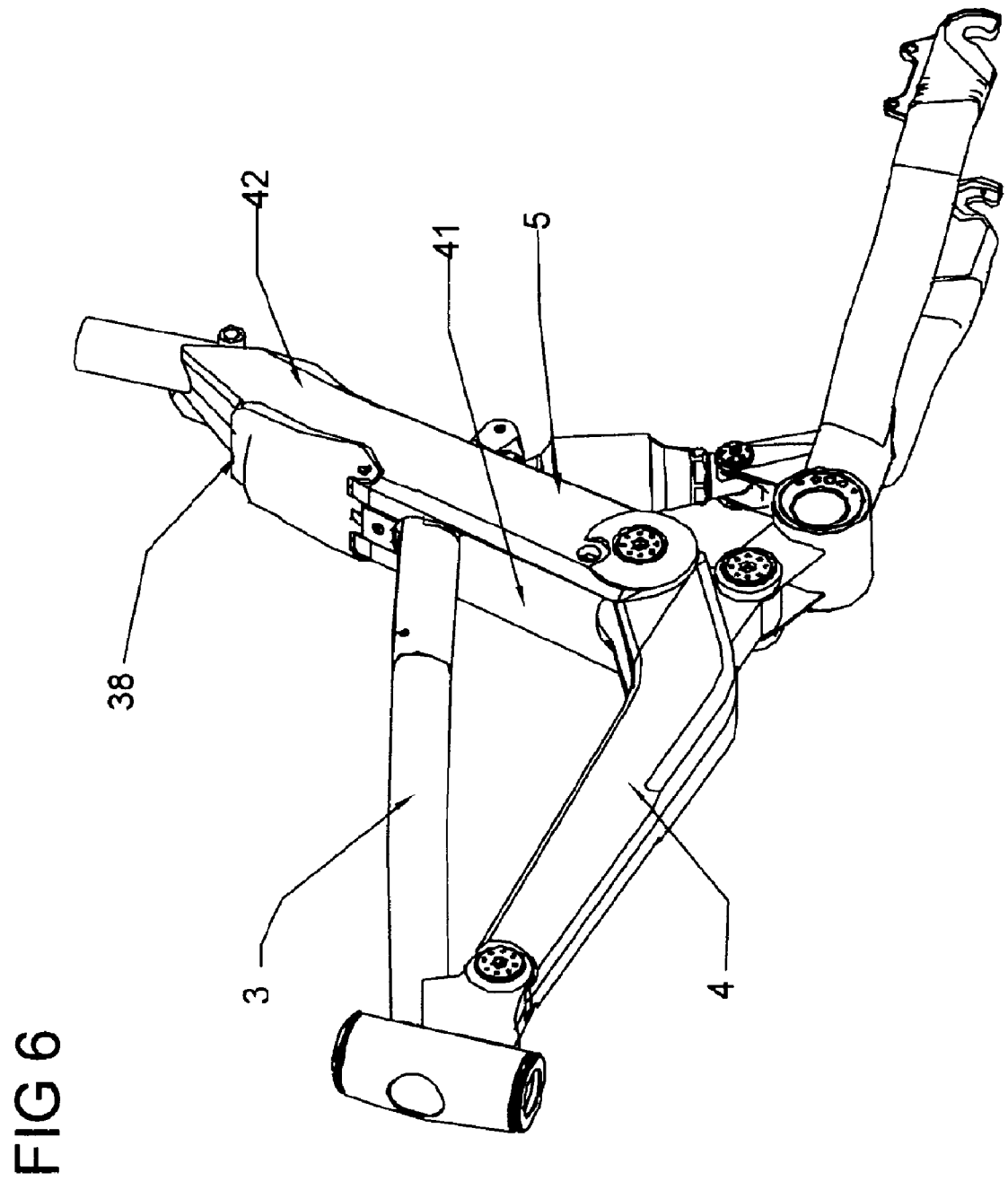
FIG. 6 shows, in a perspective view, the frame of the collapsible bicycle from FIG. 1, viewed obliquely from the front.

The seat stay 5 comprises, at its one end 38a, the articulation point 24. The seat stay 5 is articulated at the down tube 4 and supports, at its other end 38, a seat tube 39 supporting a seat 40 at its free end. The seat stay 5 further comprises a fork-shaped section 41 through which the head tube 3 extends in the position of the frame shown in FIG. 6. A stalk-shaped section 42, which supports the seat tube 39, is attached to the fork-shaped section 41.

Furthermore, the seat stay 5 comprises, at its end 38, an articulation point 44 for articulating a carrier 45 at its one end at the seat stay 5. With an offset from the articulation point 44, a further articulation point 46 is provided at the carrier 45 for articulating a carrier support stay 47 at its one end. At its other end, the carrier support stay 47 is articulated at an articulation point 48 at the end 37 of the head tube 3.

Figure 10:
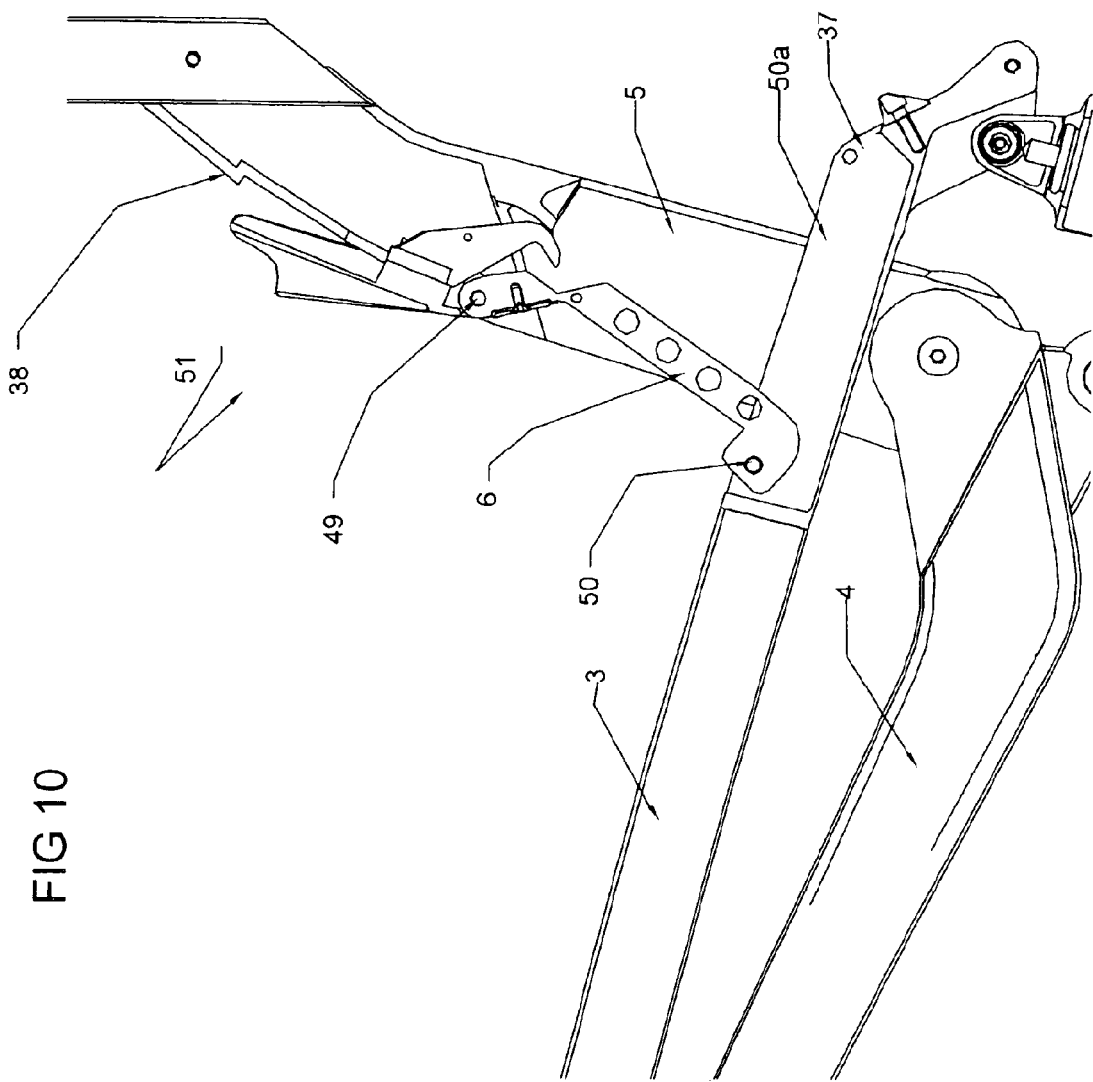
FIG. 10 shows a view C from FIG. 3, with the head tube, the seat stay and the down tube represented (partially) in section.

As can be seen from FIG. 7 and FIG. 10, the lever 6 is articulated at an articulation point 49 at the end 38 of the seat stay 5, and at an articulation point 50 at the end 37 of the head tube 3. In the position shown in FIG. 7, the lever 6 is arranged partially recessed in a recess 50a in the end 37 of the head tube 3. The lever 6 consists of a long section 50b including the articulation point 50 and a short section 50c having the articulation point 49. Relatively to the long section 50b, the short section 50c is bent upwards in a region with a recess 50d.

The articulation points 18, 24, 26, 34, 36, 44, 46, 48, 49, 50, 127, 128, 129, 131, 137 are preferably designed as hinges and each comprise a rotational axis essentially perpendicular to the paper plane or perpendicular to the plane of the frame 2.

A connecting element 51 is articulated at the articulation point 49. The connecting element 51 could also be articulated at another point of the seat stay 5, but the number of components is thus reduced.

The connecting element 51 (see in particular FIG. 7) comprises a release handle 52 having the articulation point 49. A hook 53 is attached to the release handle 52. The hook 53 is designed to engage a pin 54 formed on the end 37 of the head tube 3, in the locked position of the connecting element 51.

Furthermore, a spring 55 is provided with one end engaged with the hook 53 and the other end attached to the seat stay 5 on the collapsible bicycles rear side relatively to the hook 53. The seat stay 5 comprises a stop 60 for the hook 53 after it has released the pin 54 (this can be seen in FIG. 9).

The release handle 52, the hook 53 and the pin 54 interact as an upper dead centre mechanism. Thereby, an autonomous release of the hook 53 from the pin 54 is avoided.

Figure 8:
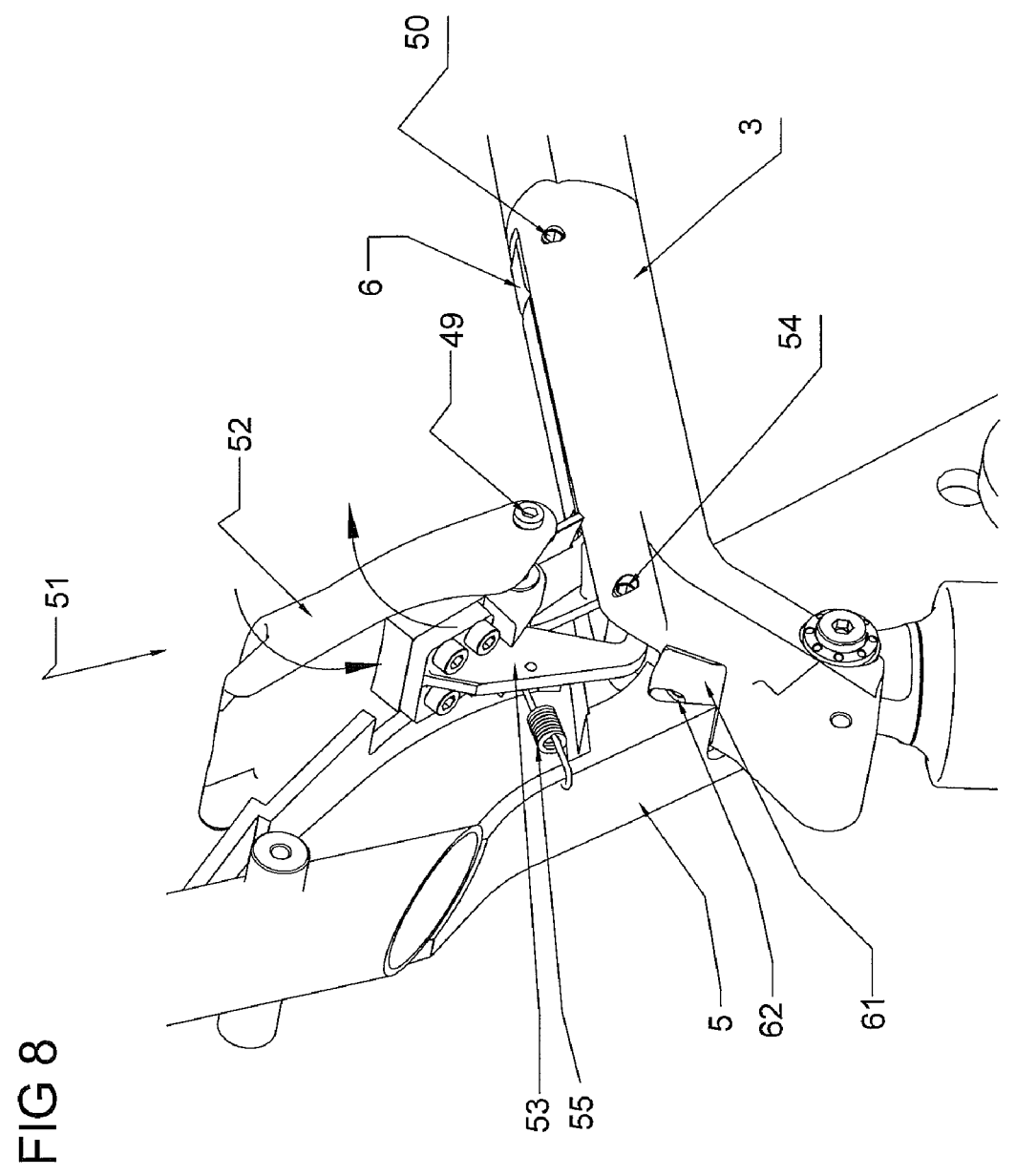

The end 37 of the head tube 3 comprises preferably an essentially pyramidal (shown in FIG. 8) or conical (not shown) receiving element 61 designed to engage in a hollow pyramidal (shown in FIG. 8) or hollow conical (not shown) support element 62 provided on the end 38 of the seat stay 5. "Conical" is understood to mean the shape of a cone or truncated cone, and "hollow conical" is understood to mean the shape of a hollow cone or hollow truncated cone.

Figure 7A:
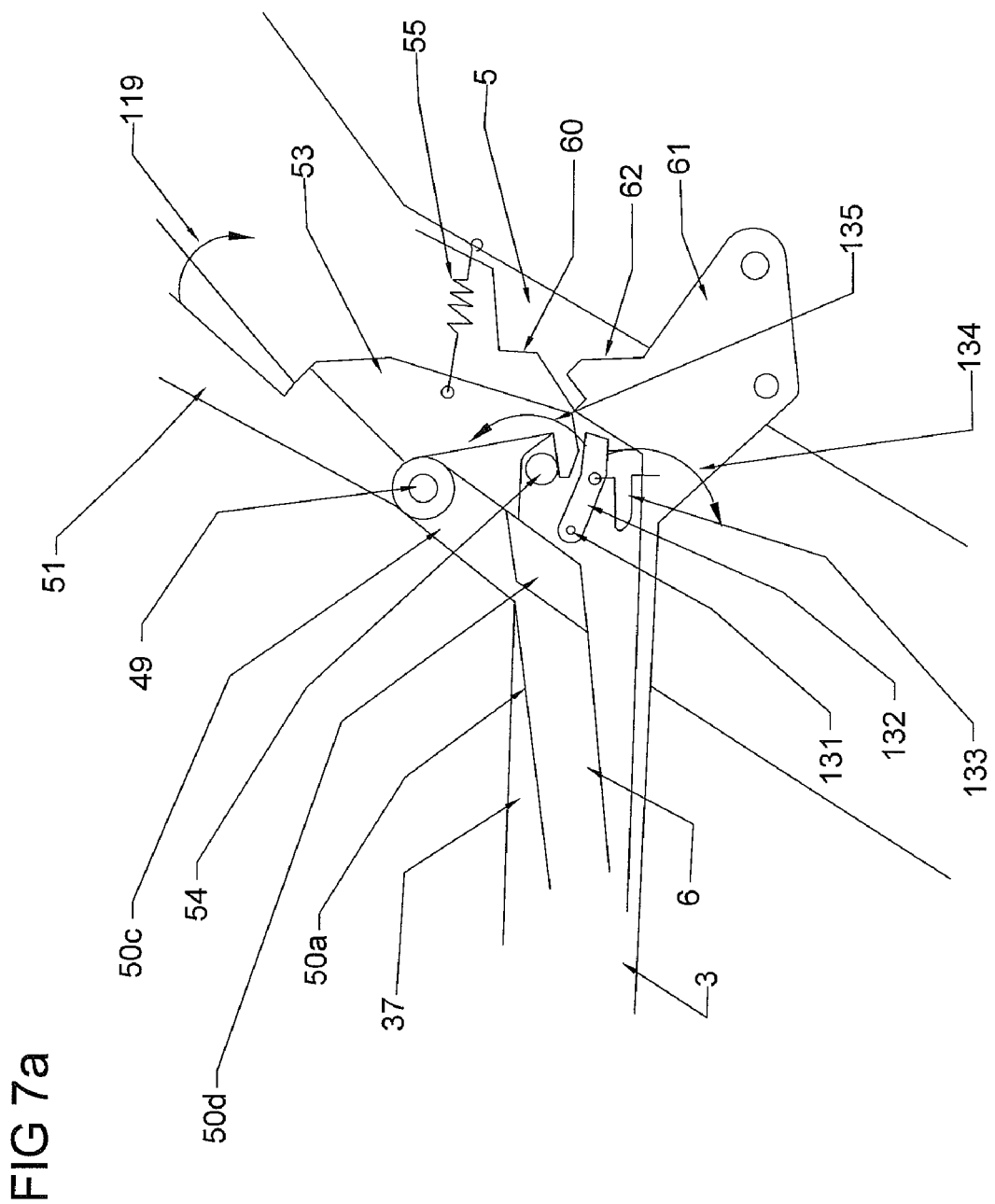
FIG. 7a shows the view from FIG. 7, but according to a further exemplary embodiment of the present invention.
Figure 9A:
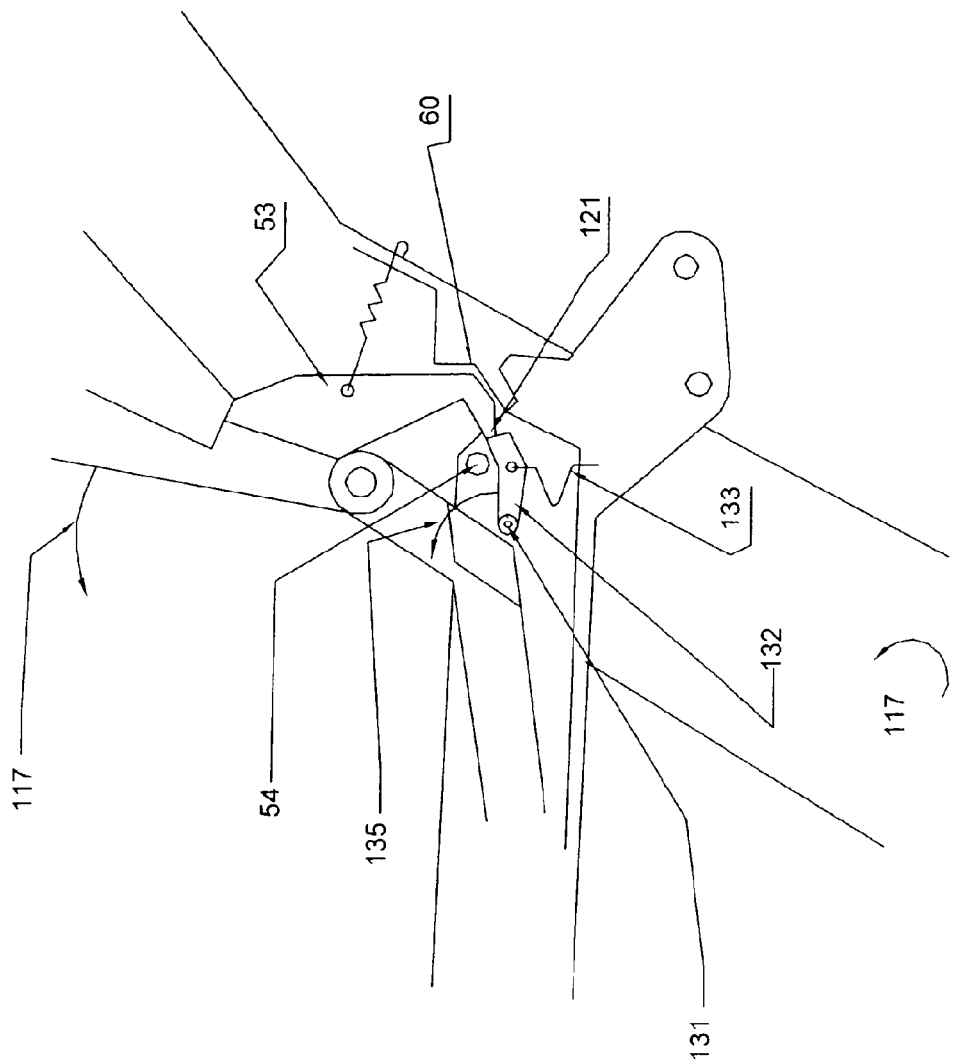
FIG. 9a shows the view from FIG. 7a, with the closing element released.

A further exemplary embodiment of the present invention is shown in FIGS. 7a and 9a.

The further exemplary embodiment differs from the exemplary embodiment according to FIGS. 7 and 9 as follows:

A pawl lever 132 is articulated at an articulation point 131 at the head tube 3. A spring 133, preferably designed as a compression spring, is attached at its one end to the head tube 3 and at its other end to the pawl lever 132. In the position shown in FIG. 7a, the pawl lever 132 is clamped in the shifting direction 135 and therefore bears against the hook 53. In FIG. 9a, the tip 121 of the hook 53 bears against the pawl lever 132. The spring 133 is provided for moving the pawl lever 132 into the path of the tip 121.

The mode of operation will be explained later.

The structure of the handlebar 15 will be explained in greater detail in the following.

The handlebar 15 comprises two L-shaped tubes 90, 91 each including a long section 92, 93 and a short section angled to the long section 92, 93 and designed as a handle 94 and 95, respectively. The handles 94, 95 are provided to steer the collapsible bicycle 1.

The two handlebar tubes 90, 91 are each fitted pivotably on a fastening device 96 by hinges 97, 98. The handlebar 15 is releasably fastenable to the front fork 12 above the front tube 11 (see FIG. 1) by the fastening device 96.

The fastening device 96 comprises arms 102, 103 formed laterally on a tubular clip 104 for clamping the front wheel fork 12, and bent towards the collapsible bicycle rear side 8. At their ends, the arms 102, 103 each comprise a preferably hemispherical bearing half 105, 106 fixedly connected to the arms 102, 103, respectively.

The bearing halves 107 and 108, which are fixedly fitted to handlebar tubes 90 and 91, respectively, are arranged opposing the bearing halves 105 and 106, respectively.

The hinges 97, 98 are of identical construction. Thus, the structure of one such hinge is just exemplary explained in greater detail in the following on the basis of the hinge 97. An articulated pin 109, which at its one end comprises a head 110 engaging the bearing half 107, extends in the bearing halves 105, 107 through a bore not shown in greater detail. An eccentric clamping lever 111 is articulated at the other end of the articulated pin 109. The articulated pin 109, together with the clamping lever 111, forms a generally known "quick release fastener". The articulated pin 109 is aligned obliquely perpendicular to the plane of the frame 2.

The bearing halves 107 and 108 are linked in an articulated fashion by a cardan joint 115. A rotary movement of one of the bearing halves 107 or 108 around the articulated pin 109 therefore results immediately in rotary movement of the other bearing half 108 and 107, respectively.

By closing the clamping lever 111, the bearing halves 105 and 107 or 106 and 108, respectively, are pressed together in such a way that there is friction and/or positive contact between the respective bearing halves 105, 107 or 106, 108, respectively, thus preventing a shifting of the handlebar tubes 90, 91 relatively to the fastening device 96. In a released condition of the clamping lever 111, as shown in FIG. 14 for the left clamping lever, handlebar tubes 90, 91 are together arbitrarily shiftable (due to the cardan joint 115) relative to the fastening device 96.

The bearing halves are preferably provided with corresponding engaging and receiving elements (denoted by way of example by reference number 112 for a preferably cake-shaped engaging element on bearing half 107 and a corresponding recess 113 in bearing half 105) for achieving a positive contact between the bearing halves 105 and 107 when the clamping lever 111 is closed.

Figure 14:
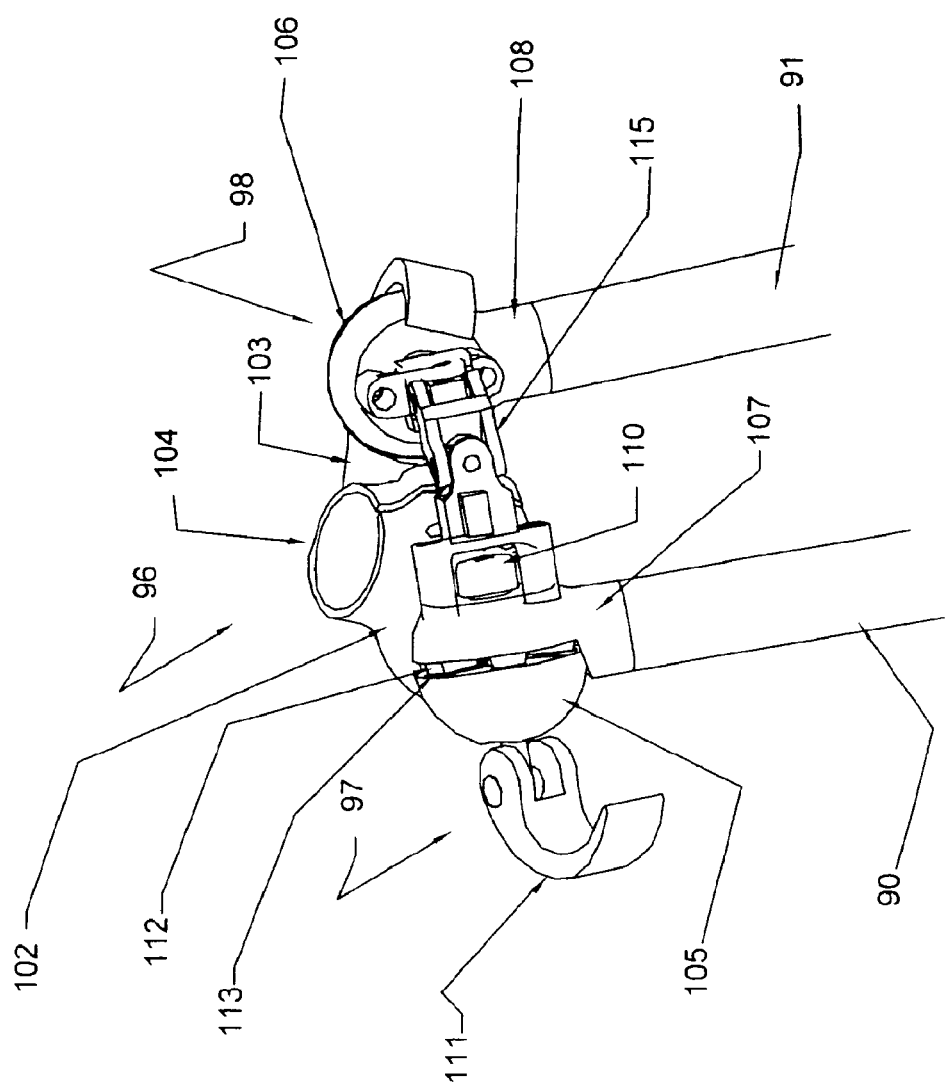
FIG. 14 shows an enlarged view E from FIG. 13, with the left clamping lever released.
Figure 15:
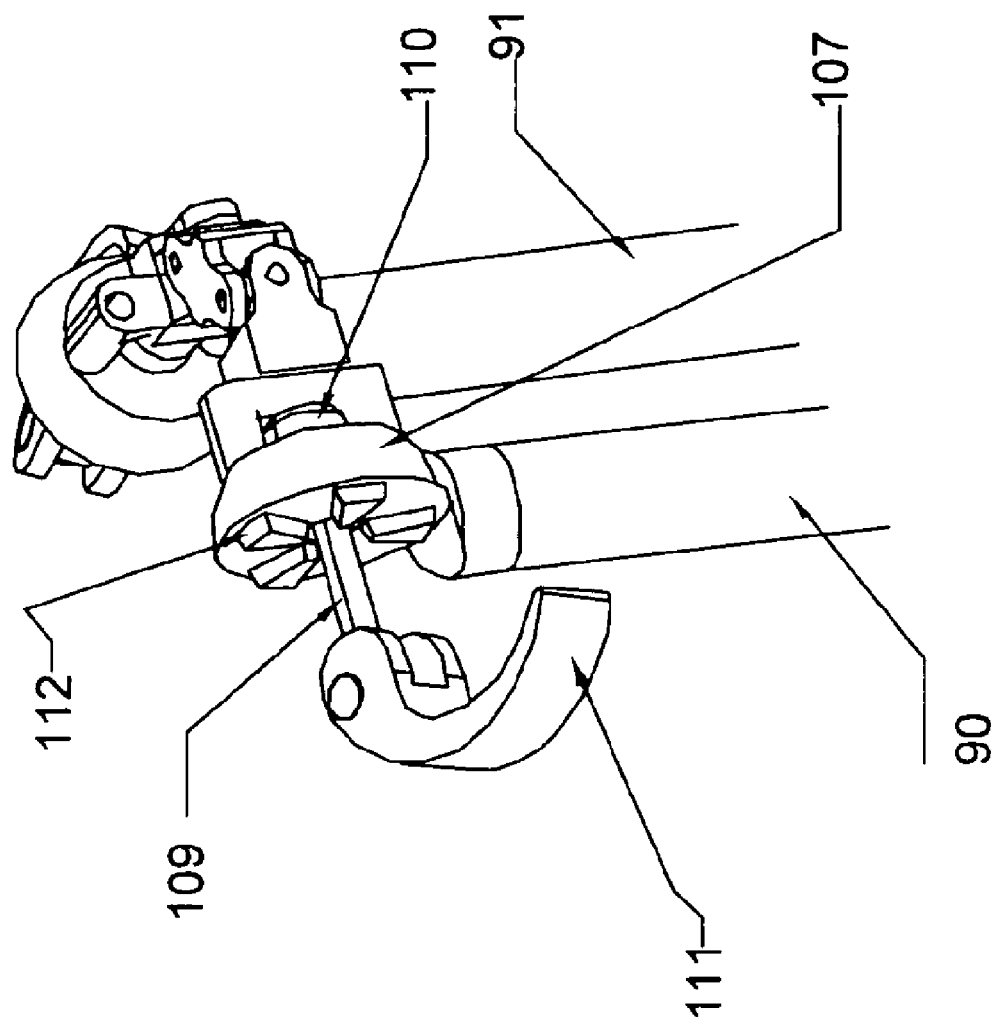
FIG. 15 shows the view from FIG. 14, in which the handlebar is represented without the fastening device.

When the clamping lever 111 is released, as shown in FIG. 14, a compression spring arranged between the bearing halves 105 and 107 (not shown) ensures that the bearing halves 105 and 107 move in opposite directions in such a way that the engaging and receiving elements 112 and 113 disengage from each other, thereby releasing a shifting movement of the handlebar tubes 90, 91 relatively to the fastening device 96.

The collapsibility of the collapsible bicycle 1 from the riding position shown in FIG. 1 to the sliding position shown in FIG. 4, and also to the storing position shown in FIG. 5, will be explained in detail in the following with reference to FIGS. 1 to 12.

FIG. 1 shows the riding position of the collapsible bicycle 1. The frame 2 is provided stiff, i.e. invariable in shape. For this purpose, the connecting element 51 is in the locked position, with the hook 53 engaging the pin 54 and therefore connecting the head tube 3 fixedly to the seat stay 5. The engagement of the pin 54 in the locked position of the connecting element 51 is shown clearly in FIG. 8.

In the riding position, the collapsible bicycle 1 can be ridden as a normal bicycle.

Figure 4:
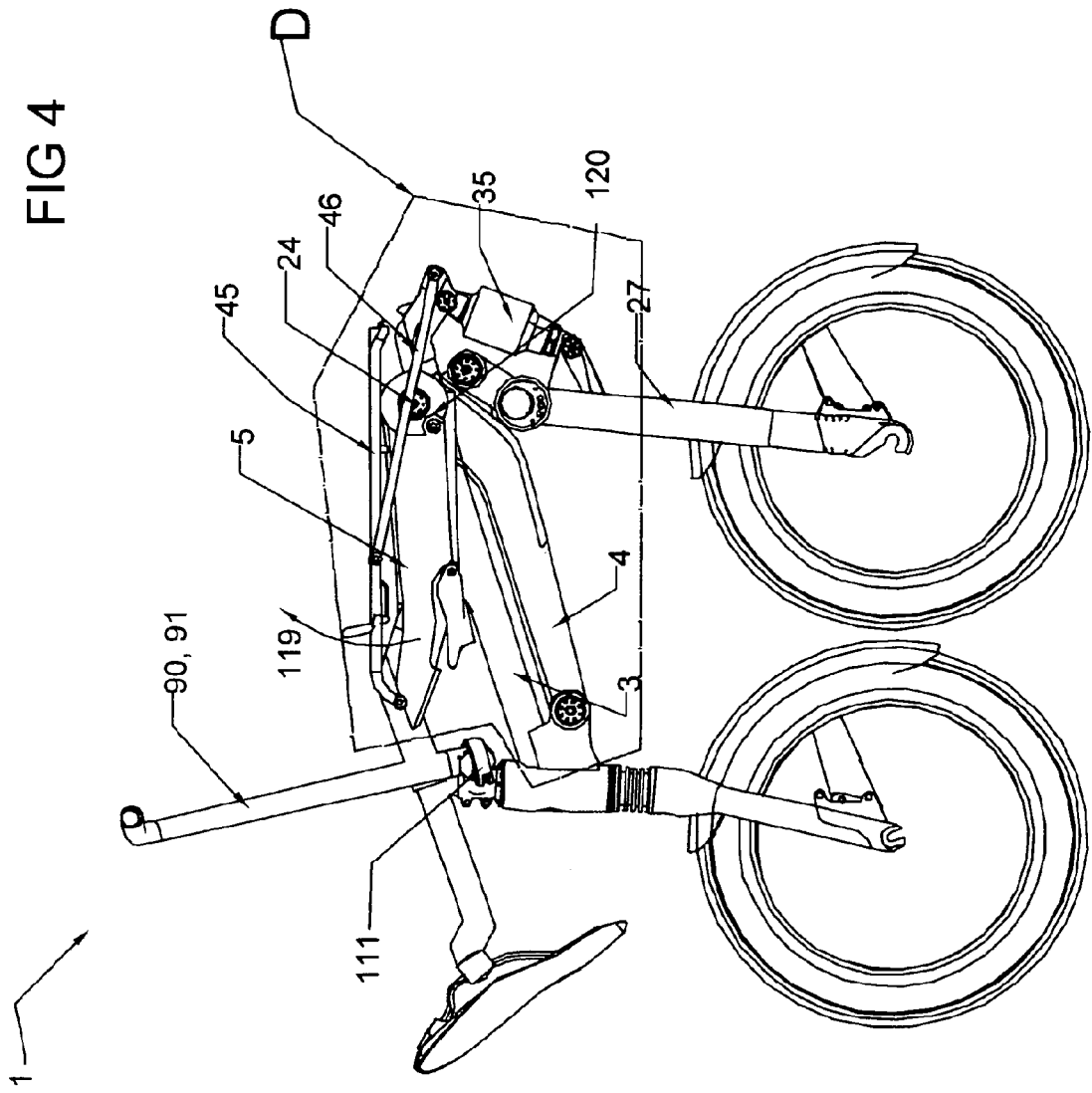
FIG. 4 shows the collapsible bicycle from FIG. 1 in the sliding position.
Figure 5:
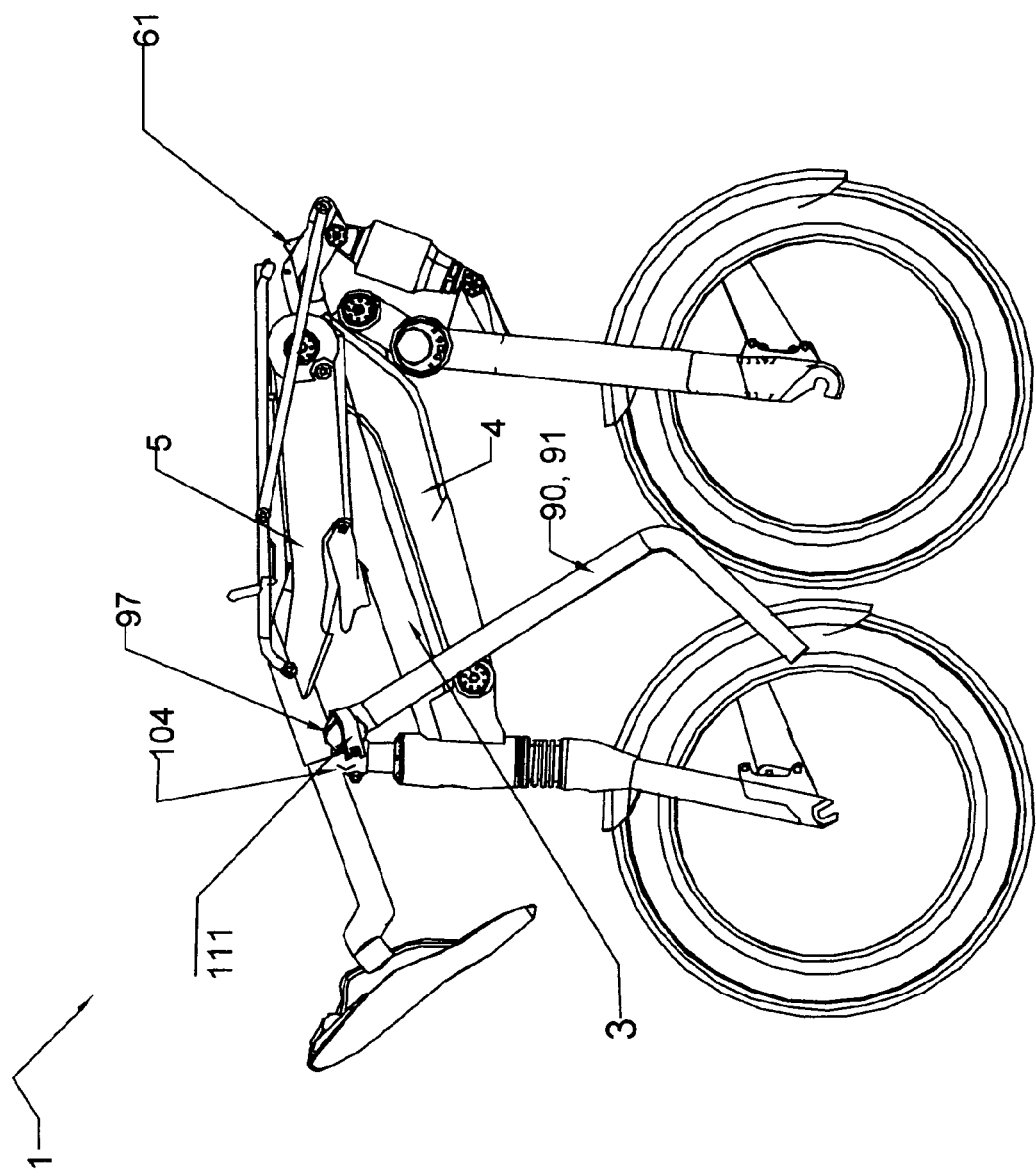
FIG. 5 shows the collapsible bicycle from FIG. 1 in a storing position.

If the collapsible bicycle 1 is now to be moved from the riding position shown in FIG. 1 to the sliding position shown in FIG. 4, the locked connecting element 51 must be released. For this purpose, a user shifts the release handle 53 in the shifting direction 117, counter-clockwise in FIGS. 1 and 7, around the articulation point 49. Consequently, the hook 53 also shifts around the articulation point 49 in the shifting direction 117, thereby releasing the pin 54. If the release handle 52 is now moved further in the shifting direction 117, the hook 53 hits against the stop 60 (see FIG. 9). Further movement of the release handle 52 in the shifting direction 117 no longer results in a further shifting of the release handle 52 but in a shifting of the end 38 of the seat stay 5 in the shifting direction 117, i.e. in the clockwise direction (see FIGS. 3 and 10), around the articulation points 24 and 49, respectively, towards the seat stay head tube 3. In this case, the articulation point 26 moves upwards, whereby the rear wheel fork 27, including the rear wheel 28, shifts in the direction of the front wheel 13 or the collapsible bicycle front side 7, respectively, around the articulation point 26. The articulation point 44 of the carrier 45 also shifts with the end 38. Whereby, the carrier also moves in the direction of the head tube 3 (see FIG. 3).

Figure 11:
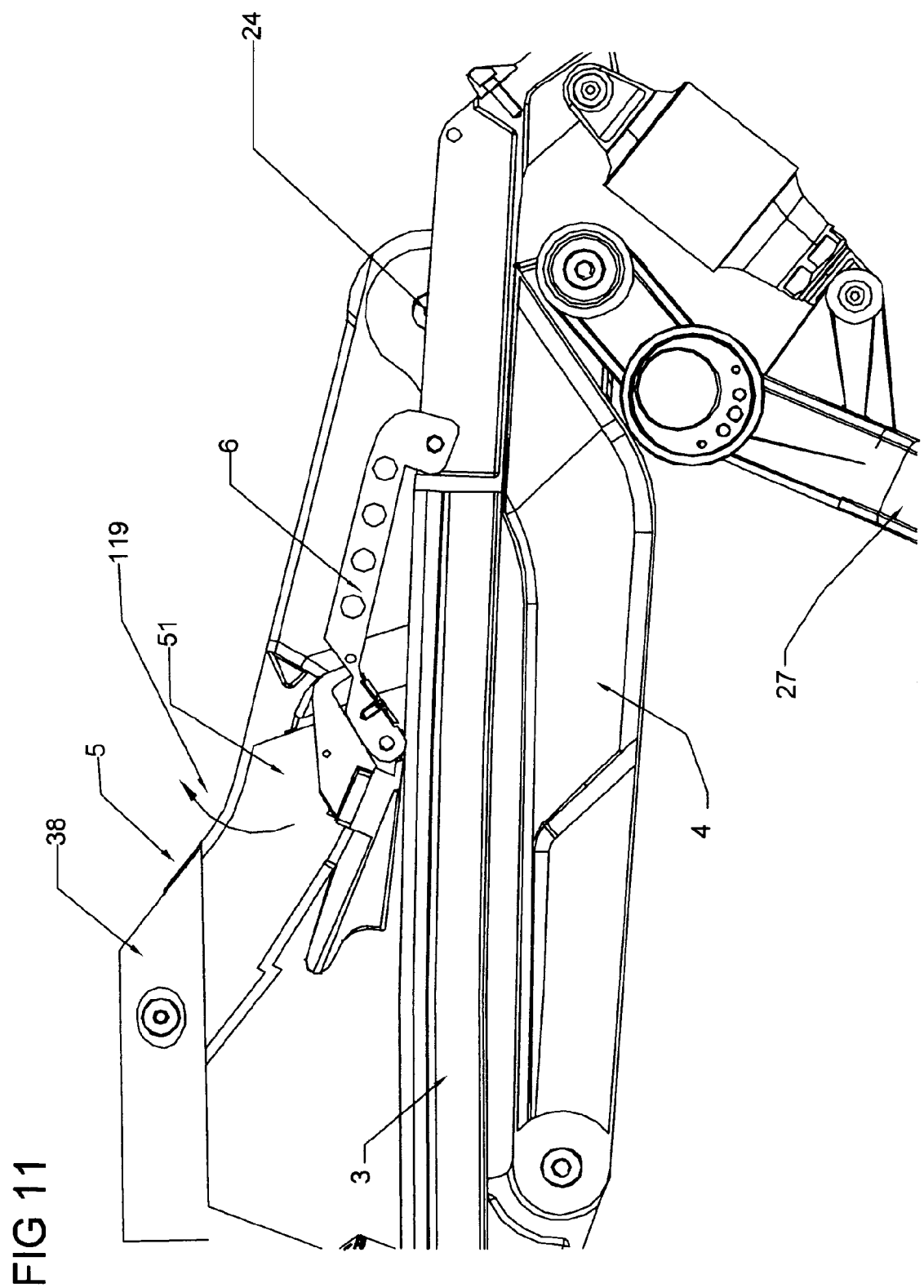
FIG. 11 shows an enlarged view D from FIG. 4, with the head tube, the seat stay and the down tube represented (partially) in section.
Figure 12:
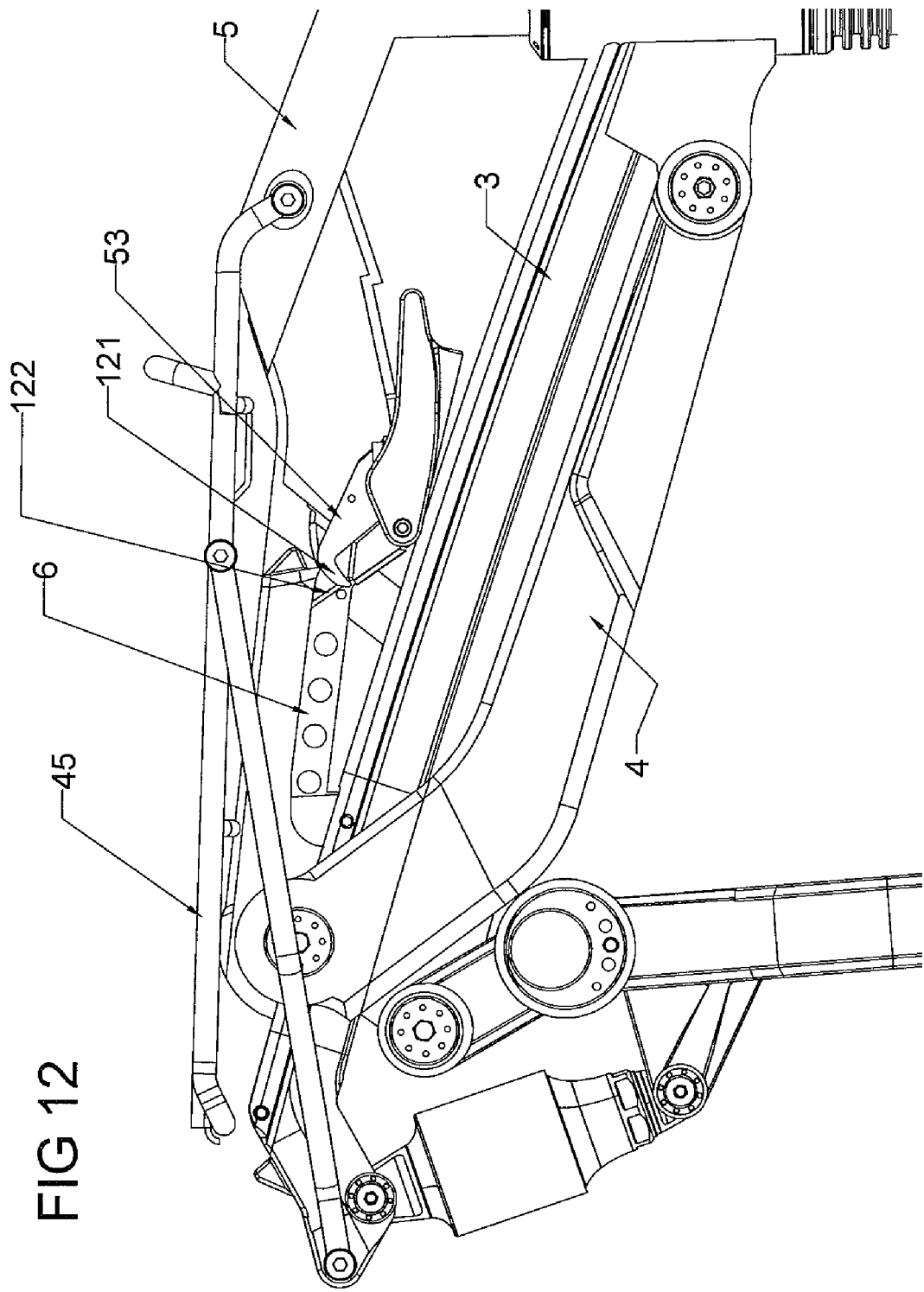
FIG. 12 shows a rear view of FIG. 11, with the components also represented in section.

The shifting movement ends when the seat stay 5 is essentially parallel to the head tube 3 and in sections touches it, as shown in FIGS. 4 and 11. The collapsible bicycle 1 is therefore in the sliding position, with the seat stay 5 or the seat tube 39, respectively (according to dimensioning) extending between the handlebar tubes 90, 91, with the rear wheel 28 arranged adjacent to the front wheel 13, and with the carrier 45 collapsed onto the seat stay 5. In this position, the collapsible bicycle 1 can still be steered and maneuvered perfectly by the handlebar tubes 90, 91. However, it has much smaller dimensions in the plane of the frame 2.

Preferably, a mechanism 120 (see FIG. 4) is provided for fixing the articulation point 24 in such a way that a shifting of the seat stay 5 relatively to the down tube 4 is prevented. The collapsible bicycle 1 is therefore retained securely in the sliding position.

As can be seen in FIG. 1, the tip 121 of the hook 53 bears against a stop 122 formed on the lever 6 in the sliding position, thereby reducing rattling noises.

In the riding position and in the sliding position shown in FIGS. 1 and 4, respectively, the grips 94, 95 of the handlebar tubes 90, 91 extend essentially in a plane perpendicular to the plane of the frame 2 (referred to in the following as the extended position of the handlebar tubes).

If the collapsible bicycle 1 is now to be moved from the sliding position into the storing position, the user releases the clamping lever 111 and alternatively shifts one of the handlebar tubes 90 or 91 from the extended position downwards, causing both of them to shift towards the plane of the frame 2 and then essentially to bear against it (referred to in the following as the collapsed position of the handlebar tubes). The user is then free to reclose clamping lever 111 so that the handlebar tubes 90, 91 are fixed in the collapsed position shown in FIG. 5, i.e. they are unable to shift.

For moving the collapsible bicycle 1 from the sliding position to the riding position, the end 38 is shifted towards the direction 119, i.e. counter-clockwise (see FIGS. 4 and 11), around the articulation point 24. The spring 55 (see FIG. 7) ensures the hook 53 is retained in such a position that only the tip 121 of the hook 53 bears against the pin 54. The hook 53 snaps over the pin 54 as movement of the end 38 in the shifting direction 119 continues, and therefore grips underneath the pin 54, i.e. engages the pin 54, thereby locking the riding position. The user then also actuates the release handle 52 in the shifting direction 119, i.e. clockwise in FIG. 7, and the hook 53 fully engages the pin 54. Whereby, the seat stay 5 is clamped with the head tube 3, and the collapsible bicycle 1 is returned to the riding position.

In the exemplary embodiment shown in FIGS. 7 and 9, the following may take place: The user releases the connecting element 51. Thereby, the hook 53 is disengaged from the pin 54. Now, if the user omits to shift the end 38 of the seat stay 5 towards the head tube 3 or to retain the seat stay 5, respectively, the tip 121 may reengage with the pin 54 due to the weight of the seat stay 5, for example. In that case, the user has to manipulate again the connecting element 51 to enable a shifting back of the end 38 of the seat stay 5 to the head tube 3.

In the exemplary embodiment according to FIGS. 7a and 9a, an unintentional reengagement of the tip 121, as described above, is also prevented, contrary to the exemplary embodiment according to FIGS. 7 and 9.

If the connecting element 51 is released, whereby the hook 53 is disengaged from the pin 54, the spring 133 (see FIG. 9a) moves the pawl lever 132 into the path of the tip 121, thereby preventing an reengagement of the tip 121 behind the pin 54, even if no shifting of the seat stay 5 takes place and the user exerts no further force/torque on it. However, if the upper end 38 of the seat stay 5 is shifted from the sliding position into the riding position, the tip 121 snaps over the pin 54 as in the exemplary embodiment shown in FIGS. 7 and 9. In this case, the pawl lever 132 is then shifted in direction 134 (see FIG. 7a) against the force of spring 133.

Figure 16:
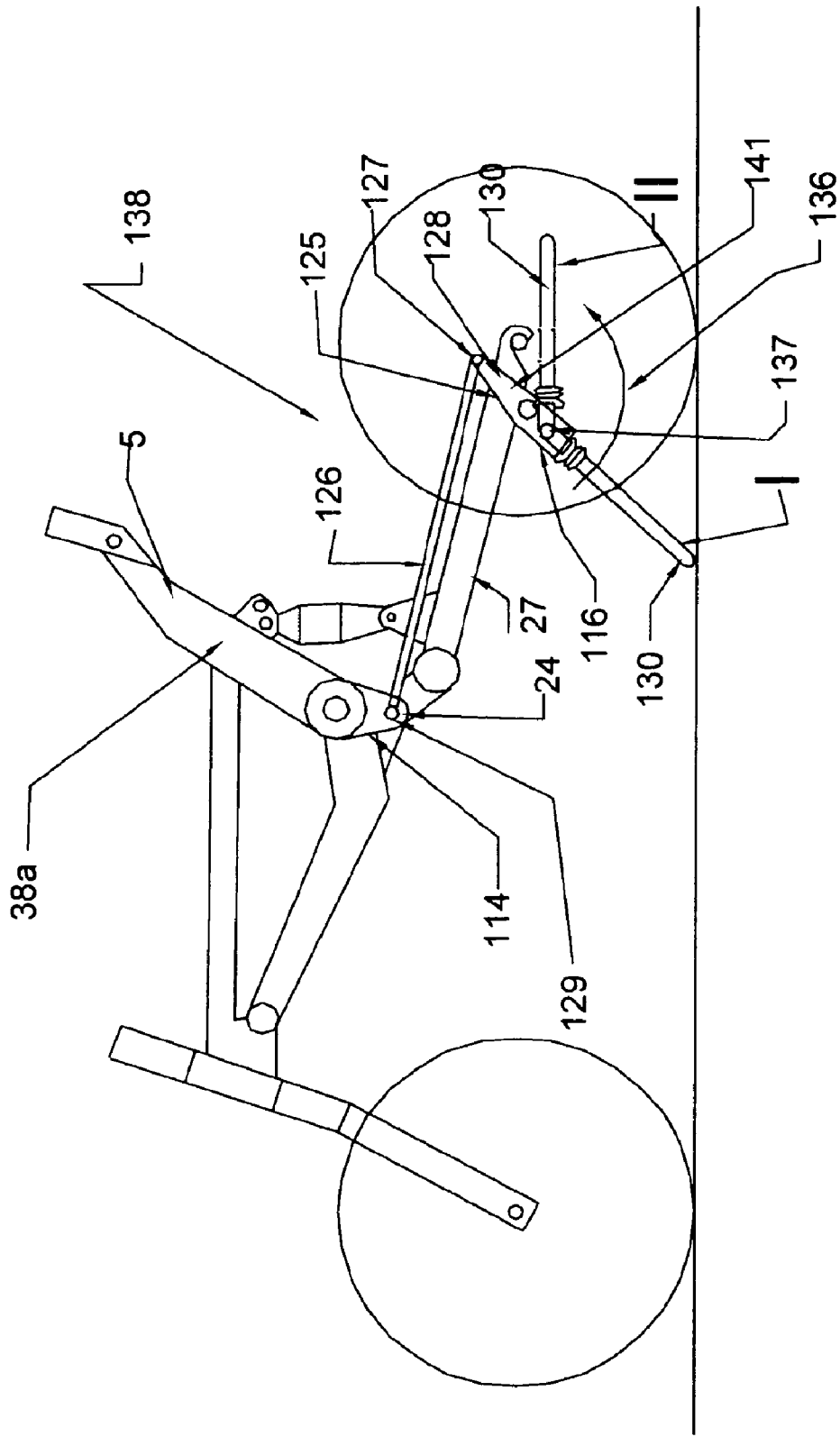
FIG. 16 shows the collapsible bicycle from FIG. 1 in the riding position with a stand which supports the collapsible bicycle.
Figure 17:
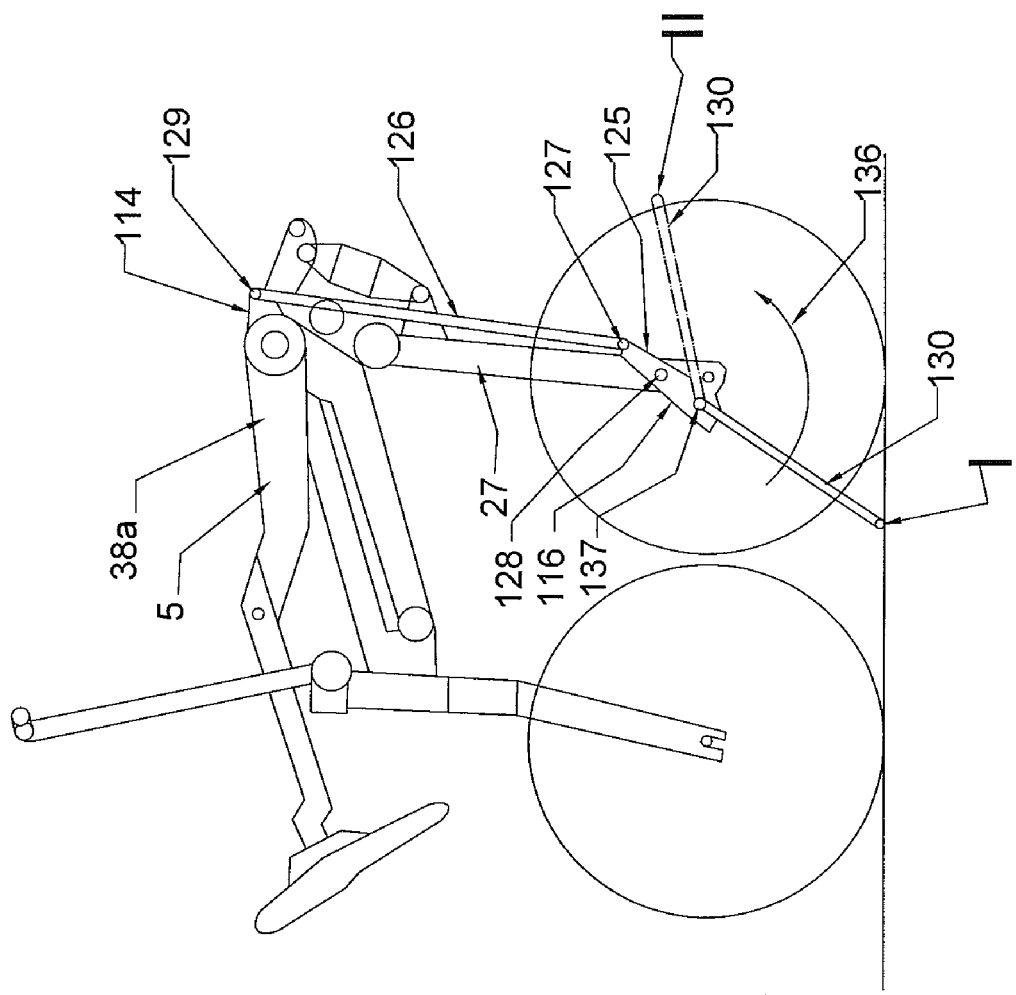
FIG. 17 shows the view from FIG. 16, in which the collapsible bicycle is in the sliding position and the stand supports the collapsible bicycle.

The collapsible bicycle 1 is also preferably equipped with a stand device 138, as shown in FIGS. 16 and 17.

The collapsible bicycle 1 comprises a stand holder 125 on which is fitted a stand 130 pivotably around an articulation point 137 between an extended position I for supporting the collapsible bicycle 1 and a retracted position II (denoted by dotted lines in FIG. 16) for riding the collapsible bicycle 1. Furthermore, the collapsible bicycle 1 comprises a stand stay 126.

The stand holder 125 is articulated at the rear wheel fork 27 at an articulation point 128 and the stand stay 126 is articulated at a lug 114 at the lower end 38a of the seat stay 5 at an articulation point 129 and at the stand holder 125 at an articulation point 127. The articulation points 127 and 137 are in this case provided at opposing ends 116 and 141 of the stand holder 125, respectively.

The articulation points 127, 128, 129 are arranged relative to each in such a way that the stand 130 remains in the extended position I when the collapsible bicycle 1 is moved between the riding position and the sliding position. However, the stand 130 can be moved anytime into the retracted position II by shifting in direction 136.

Notwithstanding the present invention was described by gall preferred embodiments, it is not limited to these embodiments but modifiable in various ways.

What is claimed is:

1. A collapsible bicycle, having a frame, which is collapsible in its plane, wherein the frame comprises:
    a head tube having a collapsible bicycle front side end in which a front wheel fork, which receives a front wheel, is mounted;
    a seat stay having an end, which receives a seat tube;
    a lever being articulated at a first articulation point, being at a collapsible bicycle rear side end of the head tube, and at a second articulation point, being at the end of the seat stay, which receives the seat tube, wherein the lever in relation to the seat stay being arranged to the collapsible bicycle front side in a riding position of the collapsible bicycle;
    a down tube being articulated at a third articulation point, being at the collapsible bicycle front side end of the head tube, and at a fourth articulation point, being at an end of the seat stay, which is opposing the end of the seat tube;
    wherein the first, second, third and fourth articulation points are arranged to each other in such a way, that for moving the collapsible bicycle from the riding position into a sliding position or from the sliding position into the riding position, respectively, the end of the seat stay, which receives the seat tube, being shiftable in a direction towards the head tube or in a direction away from the head tube, respectively;
    a rear wheel fork, which receives a rear wheel, articulated at a fifth articulation point at a collapsible bicycle rear side end of the down tube; and
    a rear wheel stay articulated at a sixth articulation point at the collapsible bicycle rear side end of the head tube and at a seventh articulation point at the rear wheel fork, wherein the first, second, third, fourth, fifth, sixth and seventh articulation points are arranged in such a way, that the rear wheel shifts by shifting the end of the seat stay receiving the seat tube in the direction towards the head tube or in the direction away from the head tube, respectively, in a direction towards the front wheel or in a direction away from the front wheel, respectively.

2. The collapsible bicycle as claimed in claim 1, wherein the down tube comprises an end section bent towards the head tube, at which the seat stay is articulated.

3. The collapsible bicycle as claimed in claim 2, wherein a lug, at which a rear wheel fork is articulated, protrudes from the bent end section.

4. A collapsible bicycle, having a frame, which is collapsible in its plane, wherein the frame comprises:
    a head tube having a collapsible bicycle front side end in which a front wheel fork, which receives a front wheel, is mounted;
    a seat stay having an end, which receives a seat tube;
    a lever being articulated at a first articulation point, being at a collapsible bicycle rear side end of the head tube, and at a second articulation point, being at the end of the seat stay, which receives the seat tube, wherein the lever in relation to the seat stay being arranged to the collapsible bicycle front side in a riding position of the collapsible bicycle;
    a down tube being articulated at a third articulation point, being at the collapsible bicycle front side end of the head tube, and at a fourth articulation point, being at an end of the seat stay, which is opposing the end of the seat tube;
    wherein the first, second, third and fourth articulation points are arranged to each other in such a way, that for moving the collapsible bicycle from the riding position into a sliding position or from the sliding position into the riding position, respectively, the end of the seat stay, which receives the seat tube, being shiftable in a direction towards the head tube or in a direction away from the head tube, respectively, wherein the seat stay comprises a fork-shaped section through which the head tube extends.

5. A collapsible bicycle, having a frame, which is collapsible in its plane, wherein the frame comprises:
    a head tube having a collapsible bicycle front side end in which a front wheel fork, which receives a front wheel, is mounted;
    a seat stay having an end, which receives a seat tube;
    a lever being articulated at a first articulation point, being at a collapsible bicycle rear side end of the head tube, and at a second articulation point, being at the end of the seat stay, which receives the seat tube, wherein the lever in relation to the seat stay being arranged to the collapsible bicycle front side in a riding position of the collapsible bicycle;
    a down tube being articulated at a third articulation point, being at the collapsible bicycle front side end of the head tube, and at a fourth articulation point, being at an end of the seat stay, which is opposing the end of the seat tube;
    wherein the first, second, third and fourth articulation points are arranged to each other in such a way, that for moving the collapsible bicycle from the riding position into a sliding position or from the sliding position into the riding position, respectively, the end of the seat stay, which receives the seat tube, being shiftable in a direction towards the head tube or in a direction away from the head tube, respectively;
    a carrier; and
    at least one carrier support stay, wherein the carrier is articulated at an articulation point at the seat stay, wherein the at least one carrier support stay is articulated at an articulation point at the end of the head tube and at the carrier, wherein the articulation points of the carrier and the at least one carrier support stay are arranged in such a way that the carrier is provided in the riding position and in the sliding position with an essentially horizontal position or in a direction towards a rear of the collapsible bicycle in an upward rising position.

6. The collapsible bicycle as claimed in claim 5, wherein the down tube comprises an end section bent towards the head tube, at which the seat stay is articulated.

7. The collapsible bicycle as claimed in claim 6, wherein a lug, at which a rear wheel fork is articulated, protrudes from the bent end section.

8. The collapsible bicycle as claimed in claim 5, wherein the head tube comprises a recess in which the lever is concealed in the riding position of the collapsible bicycle.

9. The collapsible bicycle as claimed in claim 5, wherein the seat stay comprises a support element, and wherein the head tube comprises a receiving element providing a form closure in one plane essentially perpendicular to the seat stay.

10. The collapsible bicycle as claimed in claim 9, wherein the support element has a hollow conical shape and the receiving element has a conical shape, and wherein the support and receiving elements match together in the riding position of the collapsible bicycle.

11. The collapsible bicycle as claimed in claim 5, wherein the seat stay is compoundable to the head tube for the riding position of the collapsible bicycle by locking a connecting element arranged at the seat stay, and wherein the seat stay is releasable for shifting of the seat stay in a first shifting direction relatively towards the head tube in a plane of the frame for the sliding position of the collapsible bicycle by loosening the connecting element.

12. The collapsible bicycle as claimed in claim 5, further comprising a handlebar comprising a fastening device releasably attaching the handlebar to the front wheel fork and two handlebar tubes shiftably attached to the fastening device by hinges between the riding position and a first storing position of the collapsible bicycle and between the sliding position and a second storing position of the collapsible bicycle.

13. The collapsible bicycle as claimed in claim 12, wherein each of the hinges comprises a bearing half attached to the handlebar tube, a bearing half attached to the fastening device, and an articulated pin supporting the hinges, wherein the bearing halves are connectable to each other for the driving position, sliding position, first and/or second storing positions in a frictional and/or positive locking.

14. The collapsible bicycle as claimed in claim 13, further comprising a clamping lever including the articulated pin and which presses the bearing halves together.

15. The collapsible bicycle as claimed in claim 14, wherein the bearing halves comprise corresponding receiving and engaging elements.

16. The collapsible bicycle as claimed in claim 15, wherein grips of the handlebar tubes extend in the riding position and sliding position essentially perpendicular to the plane of the frame, and wherein the first and the second storing positions extend essentially in the plane of the frame.

17. The collapsible bicycle as claimed in claim 14, wherein grips of the handlebar tubes extend in the riding position and sliding position essentially perpendicular to the plane of the frame, and wherein the first and the second storing positions extend essentially in the plane of the frame.

18. The collapsible bicycle as claimed in claim 14, wherein grips of the handlebar tubes extend in the riding position and sliding position essentially perpendicular to the plane of the frame, and wherein the first and the second storing positions extend essentially in the plane of the frame.

19. The collapsible bicycle as claimed in claim 13, wherein the bearing halves comprise corresponding receiving and engaging elements.

20. The collapsible bicycle as claimed in claim 19, wherein grips of the handlebar tubes extend in the riding position and sliding position essentially perpendicular to the plane of the frame, and wherein the first and the second storing positions extend essentially in the plane of the frame.

21. The collapsible bicycle as claimed in claim 13, wherein grips of the handlebar tubes extend in the riding position and sliding position essentially perpendicular to the plane of the frame, and wherein the first and the second storing positions extend essentially in the plane of the frame.

22. The collapsible bicycle as claimed in claim 12, wherein grips of the handlebar tubes extend in the riding position and sliding position essentially perpendicular to the plane of the frame, and wherein the first and the second storing positions extend essentially in the plane of the frame.

23. A collapsible bicycle, having a frame, which is collapsible in its plane, wherein the frame comprises:
    a head tube having a collapsible bicycle front side end in which a front wheel fork, which receives a front wheel, is mounted;
    a seat stay having an end, which receives a seat tube;
    a lever being articulated at a first articulation point, being at a collapsible bicycle rear side end of the head tube, and at a second articulation point, being at the end of the seat stay, which receives the seat tube, wherein the lever in relation to the seat stay being arranged to the collapsible bicycle front side in a riding position of the collapsible bicycle;
    a down tube being articulated at a third articulation point, being at the collapsible bicycle front side end of the head tube, and at a fourth articulation point, being at an end of the seat stay, which is opposing the end of the seat tube;
    wherein the first, second, third and fourth articulation points are arranged to each other in such a way, that for moving the collapsible bicycle from the riding position into a sliding position or from the sliding position into the riding position, respectively, the end of the seat stay, which receives the seat tube, being shiftable in a direction towards the head tube or in a direction away from the head tube, respectively, wherein the seat stay is compoundable to the head tube for the riding position of the collapsible bicycle by locking a connecting element arranged at the seat stay, wherein the seat stay is releasable for shifting of the seat stay in a first shifting direction relatively towards the head tube in a plane of the frame for the sliding position of the collapsible bicycle by loosening the connecting element, wherein the connecting element comprises a release handle articulated at the seat stay and a hook adjacent to the release handle, and wherein the hook engages a pin arranged on the head tube and for locking the connecting element by shifting the hook in a second shifting direction and releases the pin for loosening of the connecting element by shifting the hook in the first shifting direction.

24. The collapsible bicycle as claimed in claim 23, wherein the release handle, hook, and pin interact as an upper dead centre mechanism.

25. The collapsible bicycle as claimed in claim 24, wherein a spring provides a pretension for the hook in the first shifting direction.

26. The collapsible bicycle as claimed in claim 25, wherein the seat stay is provided with a stop on which the released connecting element hits in the first shifting direction.

27. The collapsible bicycle as claimed in claim 24, wherein the seat stay is provided with a stop on which the released connecting element hits in the first shifting direction.

28. The collapsible bicycle as claimed in claim 23, wherein a spring provides a pretension for the hook in the first shifting direction.

29. The collapsible bicycle as claimed in claim 28, wherein the seat stay is provided with a stop on which the released connecting element hits in the first shifting direction.

30. A collapsible bicycle, having a frame, which is collapsible in its plane, wherein the frame comprises:
    a head tube having a collapsible bicycle front side end in which a front wheel fork, which receives a front wheel, is mounted;
    a seat stay having an end, which receives a seat tube;

a lever being articulated at a first articulation point, being at a collapsible bicycle rear side end of the head tube, and at a second articulation point, being at the end of the seat stay, which receives the seat tube, wherein the lever in relation to the seat stay being arranged to the collapsible bicycle front side in a riding position of the collapsible bicycle;

a down tube being articulated at a third articulation point, being at the collapsible bicycle front side end of the head tube, and at a fourth articulation point, being at an end of the seat stay, which is opposing the end of the seat tube;

wherein the first, second, third and fourth articulation points are arranged to each other in such a way, that for moving the collapsible bicycle from the riding position into a sliding position or from the sliding position into the riding position, respectively, the end of the seat stay, which receives the seat tube, being shiftable in a direction towards the head tube or in a direction away from the head tube, respectively;

a handlebar comprising a fastening device releasably attaching the handlebar to the front wheel fork and two handlebar tubes shiftably attached to the fastening device by hinges between the riding position and a first storing position of the collapsible bicycle and between the sliding position and a second storing position of the collapsible bicycle, wherein each of the hinges comprises a bearing half attached to the handlebar tube, a bearing half attached to the fastening device, and an articulated pin supporting the hinges, wherein the bearing halves are connectable to each other for the driving position, sliding position, first and/or second storing positions in a frictional and/or positive locking, and wherein the bearing halves, at the handlebar tubes, are linked together by a cardan joint.

31. The collapsible bicycle as claimed in claim 30, wherein grips of the handlebar tubes extend in the riding position and sliding position essentially perpendicular to the plane of the frame, and wherein the first and the second storing positions extend essentially in the plane of the frame.

32. A collapsible bicycle, having a frame, which is collapsible in its plane, wherein the frame comprises:

a head tube having a collapsible bicycle front side end in which a front wheel fork, which receives a front wheel, is mounted;

a seat stay having an end, which receives a seat tube;

a lever being articulated at a first articulation point, being at a collapsible bicycle rear side end of the head tube, and at a second articulation point, being at the end of the seat stay, which receives the seat tube, wherein the lever in relation to the seat stay being arranged to the collapsible bicycle front side in a riding position of the collapsible bicycle;

a down tube being articulated at a third articulation point, being at the collapsible bicycle front side end of the head tube, and at a fourth articulation point, being at an end of the seat stay, which is opposing the end of the seat tube;

wherein the first, second, third and fourth articulation points are arranged to each other in such a way, that for moving the collapsible bicycle from the riding position into a sliding position or from the sliding position into the riding position, respectively, the end of the seat stay, which receives the seat tube, being shiftable in a direction towards the head tube or in a direction away from the head tube, respectively;

a handlebar comprising a fastening device releasably attaching the handlebar to the front wheel fork and two handlebar tubes shiftably attached to the fastening device by hinges between the riding position and a first storing position of the collapsible bicycle and between the sliding position and a second storing position of the collapsible bicycle, and wherein the bearing halves, at the handlebar tubes, are linked together by a cardan joint; and a clamping lever including the articulated pin and which presses the bearing halves together.

33. A collapsible bicycle, having a frame, which is collapsible in its plane, wherein the frame comprises:

a head tube having a collapsible bicycle front side end in which a front wheel fork, which receives a front wheel, is mounted;

a seat stay having an end, which receives a seat tube;

a lever being articulated at a first articulation point, being at a collapsible bicycle rear side end of the head tube, and at a second articulation point, being at the end of the seat stay, which receives the seat tube, wherein the lever in relation to the seat stay being arranged to the collapsible bicycle front side in a riding position of the collapsible bicycle;

a down tube being articulated at a third articulation point, being at the collapsible bicycle front side end of the head tube, and at a fourth articulation point, being at an end of the seat stay, which is opposing the end of the seat tube;

wherein the first, second, third and fourth articulation points are arranged to each other in such a way, that for moving the collapsible bicycle from the riding position into a sliding position or from the sliding position into the riding position, respectively, the end of the seat stay, which receives the seat tube, being shiftable in a direction towards the head tube or in a direction away from the head tube, respectively; and a handlebar comprising a fastening device releasably attaching the handlebar to the front wheel fork and two handlebar tubes shiftably attached to the fastening device by hinges between the riding position and a first storing position of the collapsible bicycle and between the sliding position and a second storing position of the collapsible bicycle, wherein each of the hinges comprises a bearing half attached to the handlebar tube, a bearing half attached to the fastening device, and an articulated pin supporting the hinges, wherein the bearing halves are connectable to each other for the driving position, sliding position, first and/or second storing positions in a frictional and/or positive locking, wherein the bearing halves, at the handlebar tubes, are linked together by a cardan joint, and wherein the bearing halves comprise corresponding receiving and engaging elements.

34. A collapsible bicycle, having a frame, which is collapsible in its plane, wherein the frame comprises:

a head tube having a collapsible bicycle front side end in which a front wheel fork, which receives a front wheel, is mounted;

a seat stay having an end, which receives a seat tube;

a lever being articulated at a first articulation point, being at a collapsible bicycle rear side end of the head tube, and at a second articulation point, being at the end of the seat stay, which receives the seat tube, wherein the lever in relation to the seat stay being arranged to the collapsible bicycle front side in a riding position of the collapsible bicycle;

a down tube being articulated at a third articulation point, being at the collapsible bicycle front side end of the head tube, and at a fourth articulation point, being at an end of the seat stay, which is opposing the end of the seat tube;

wherein the first, second, third and fourth articulation points are arranged to each other in such a way, that for moving the collapsible bicycle from the riding position into a sliding position or from the sliding position into the riding position, respectively, the end of the seat stay, which receives the seat tube, being shiftable in a direction towards the head tube or in a direction away from the head tube, respectively;

a handlebar comprising a fastening device releasably attaching the handlebar to the front wheel fork and two handlebar tubes shiftably attached to the fastening device by hinges between the riding position and a first storing position of the collapsible bicycle and between the sliding position and a second storing position of the collapsible bicycle, wherein each of the hinges comprises a bearing half attached to the handlebar tube, a bearing half attached to the fastening device, and an articulated pin supporting the hinges, wherein the bearing halves are connectable to each other for the driving position, sliding position, first and/or second storing positions in a frictional and/or positive locking, wherein the bearing halves, at the handlebar tubes, are linked together by a cardan joint; and a clamping lever including the articulated pin and which presses the bearing halves together, and wherein the bearing halves comprise corresponding receiving and engaging elements.

* * * * *